US010013603B2

United States Patent
Onis

(10) Patent No.: US 10,013,603 B2
(45) Date of Patent: Jul. 3, 2018

(54) SYSTEM AND METHOD FOR RECOGNIZING MULTIPLE OBJECT STRUCTURE

(71) Applicant: MyScript, Nantes (FR)

(72) Inventor: Sebastien Onis, Nantes (FR)

(73) Assignee: MyScript, Nantes (FR)

( * ) Notice: Subject to any disclaimer, the term of this patent is extended or adjusted under 35 U.S.C. 154(b) by 53 days.

(21) Appl. No.: 15/152,762

(22) Filed: May 12, 2016

(65) Prior Publication Data

US 2017/0206406 A1 Jul. 20, 2017

(30) Foreign Application Priority Data

Jan. 20, 2016 (EP) .................................... 16290015

(51) Int. Cl.
| | |
|---|---|
| *G06K 9/00* | (2006.01) |
| *G06K 9/72* | (2006.01) |
| *G06F 17/24* | (2006.01) |
| *G06F 3/0487* | (2013.01) |

(52) U.S. Cl.
CPC ....... *G06K 9/00422* (2013.01); *G06F 3/0487* (2013.01); *G06F 17/242* (2013.01); *G06K 9/00449* (2013.01); *G06K 9/723* (2013.01); *G06K 9/726* (2013.01)

(58) Field of Classification Search
None
See application file for complete search history.

(56) References Cited

U.S. PATENT DOCUMENTS

| | | | | | |
|---|---|---|---|---|---|
| 4,653,107 | A | * | 3/1987 | Shojima | G06K 9/00402 382/189 |
| 5,818,963 | A | * | 10/1998 | Murdock | G06K 9/00865 382/159 |
| 5,970,170 | A | * | 10/1999 | Kadashevich | G06K 9/00872 382/179 |
| 7,447,360 | B2 | | 11/2008 | Li et al. | |

(Continued)

OTHER PUBLICATIONS

International Search Report issued for PCT/EP2017/000074 dated Apr. 19, 2017.

(Continued)

*Primary Examiner* — Michelle M Entezari
(74) *Attorney, Agent, or Firm* — McDermott Will & Emery LLP

(57) ABSTRACT

A system, method, and computer program for recognizing an arrangement of multiple objects on computing devices. The computing device may include a processor and at least one non-transitory computer readable medium for recognizing handwriting input under control of the processor. The non-transitory computer readable medium may be configured to determine with the medium at least one geometrical relationship between a plurality of recognized elements of the input and allocate with the medium the recognized elements having the at least one geometrical relationship therebetween to corresponding positions of an arrangement of the recognized elements. The positions of the arrangement may be cells of a two-dimensional structure of the recognized elements. The at least one geometrical relationship may be an overlap of the plurality of recognized elements in one or more directions of the arrangement.

18 Claims, 22 Drawing Sheets

(56) References Cited

U.S. PATENT DOCUMENTS

| | | | |
|---|---|---|---|
| 8,121,412 B2 | 2/2012 | Predovic et al. | |
| 2003/0215145 A1* | 11/2003 | Shilman | G06F 3/04883 382/195 |
| 2007/0003142 A1* | 1/2007 | Simard | G06K 9/00416 382/187 |
| 2009/0123073 A1* | 5/2009 | Nelson | G06K 9/00416 382/189 |
| 2009/0304282 A1* | 12/2009 | Predovic | G06K 9/00422 382/187 |
| 2012/0014601 A1* | 1/2012 | Jiang | G06F 1/1626 382/173 |
| 2012/0114245 A1* | 5/2012 | Lakshmanan | G06K 9/00409 382/186 |
| 2016/0188970 A1* | 6/2016 | Matsuda | G06K 9/00422 382/187 |
| 2017/0109578 A1* | 4/2017 | Bednarowicz | G06K 9/00476 |

OTHER PUBLICATIONS

Written Opinion of the International Searching Authority issued for PCT/EP2017/000074 dated Apr. 19, 2017.

Toyozumi et al., "An On-line Handwritten Mathematical Equation Recognition System that Can Process Matrix Expressions by Referring to the Relative Positions of Matrix Elements", Systems and Computers in Japan, vol. 37, No. 14, pp. 87-96, Jan. 1, 2006.

Li et al., "Online Recognition of Handwritten Mathematical Expressions with Support for Matrices", 19th International Conference on Pattern Recognition, 2008: ICPR 2008; 8-11, Tampa, FL, pp. 1-4, Dec. 2008.

Alkalai, "Table Recognition in Mathematical Documents", Jan. 1, 2015, School of Computer Science College of Engineering and Physical Sciences, The University of Birmingham, pp. 1-203, Nov. 2015.

* cited by examiner

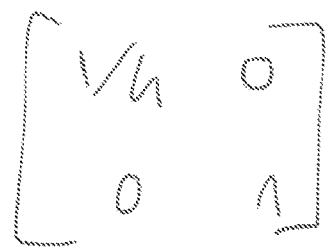
FIG. 10
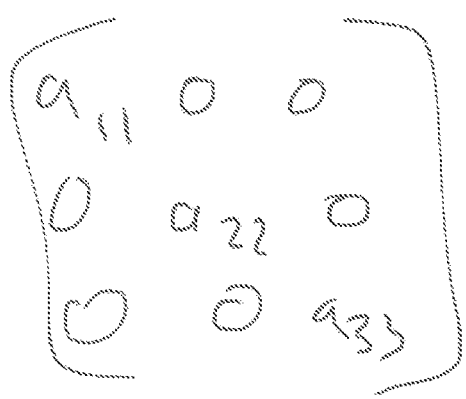
FIG. 11A
$$\begin{pmatrix} a_{11} & 0 & 0 \\ 0 & a_{22} & 0 \\ 0 & 0 & a_{33} \end{pmatrix}$$
FIG. 11B $$\begin{bmatrix} a & b & c \\ d & e & f \end{bmatrix} \begin{bmatrix} u & v \\ w & x \\ y & z \end{bmatrix} = \begin{bmatrix} au+bw+cy \\ & dv+ex+fz \end{bmatrix}$$

FIG. 14A

$$\begin{bmatrix} a & b & c \\ d & e & f \end{bmatrix} \begin{bmatrix} u & v \\ w & x \\ y & z \end{bmatrix} = \begin{bmatrix} au+bw+cy \\ & dv+ex+fz \end{bmatrix}$$

FIG. 14B

$$\begin{bmatrix} \cos\left(\frac{\pi}{6^R}\right) & -\sin\left(\frac{\pi}{6^R}\right) \\ \sin\left(\frac{\pi}{6^R}\right) & \cos\left(\frac{\pi}{6^R}\right) \end{bmatrix}$$

FIG. 15

$$\left| \begin{array}{cc} a & b \\ c & d \end{array} \right| = ad - bc$$

FIG. 19

$$A^{-1} = \frac{1}{32} \left( \begin{array}{ccc} \left| \begin{array}{cc} 2 & 3 \\ 8 & 10 \end{array} \right| & -\left| \begin{array}{cc} 1 & 3 \\ -2 & 10 \end{array} \right| & \left| \begin{array}{cc} 1 & 2 \\ -2 & 8 \end{array} \right| \\ -\left| \begin{array}{cc} 2 & 5 \\ 8 & 10 \end{array} \right| & \left| \begin{array}{cc} -1 & 5 \\ -2 & 10 \end{array} \right| & -\left| \begin{array}{cc} -1 & 2 \\ -2 & 8 \end{array} \right| \\ \left| \begin{array}{cc} 2 & 5 \\ 2 & 3 \end{array} \right| & -\left| \begin{array}{cc} -1 & 5 \\ 1 & 3 \end{array} \right| & \left| \begin{array}{cc} -1 & 2 \\ 1 & 2 \end{array} \right| \end{array} \right)$$

FIG. 20

SYSTEM AND METHOD FOR RECOGNIZING MULTIPLE OBJECT STRUCTURE

CROSS-REFERENCE TO RELATED APPLICATIONS

This application claims priority to European Application No. 16290015.3 filed on Jan. 20, 2016, which is incorporated herein by reference in its entirety and made a part thereof.

TECHNICAL FIELD

The present description relates generally to the field recognizing input of multiple handwritten objects within structures using computing devices. The present description relates more specifically to detecting two-dimensional structures for handwritten content through consideration of positional relationships of the input content and the handwriting recognition of the input content.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for drawing or inputting text. The user's handwriting is interpreted using a handwriting recognition system or method. Other systems for handwriting input to computing devices include electronic or digital pens which interact with paper, encoded surfaces or digitizing surfaces in order to have their movement relative to the surface tracked by a computing device, such as the systems provided by Anoto AB., Leapfrog Enterprises, Inc., and Livescribe, Inc.

Regardless of the input method used, handwriting recognition systems and methods typically involve determining the initiation of a digital ink stroke, such as when first contact with a touch sensitive surface is made (pen-down event); the termination of the stroke, such as when contact with the touch sensitive surface is ceased (pen-up event); and any movement (gestures or strokes) made between stroke initiation and termination. These determined strokes are processed to recognize and interpret the input. The type of computing device or input surface can also determine the type of handwriting recognition system or method utilized. For instance, if the input surface is large enough (such as a tablet), the user can handwrite input anywhere on or above the input surface, as if the user was writing on paper. This however adds complexity to the recognition task, because the separate elements to be recognized may be related dependent of the relative positions of the elements or may be unrelated independent of their relative positions.

For example, for structured content, such as mathematical equations, tables and matrices, the relative positioning of the handwritten elements are necessary for defining the structure. Some systems are available for dealing with the recognition of mathematical matrices, for example, U.S. Pat. Nos. 7,447,360 and 8,121,412. These systems rely on indicative elements for recognition, such as brackets or spatial alignment, e.g., within rows and columns, and as such merely recognize the structure without regard to the content itself. Whilst such recognition is applicable to relatively simple and well-formed matrices, they are unable to deal with more complex matrices, e.g., containing complex elements like equations, sub-matrices, etc., ill-aligned matrix elements or matrices having empty element cells, e.g., row and column positions. Further, the described systems of these patents provide absolute recognition of these structures thereby influencing recognition of the content itself.

What is required is a system that recognizes matrices and like complex content structures, that do not rely on the input of specific designation elements or gestures and do not significantly increase processing time or complexity to the recognition of themselves whilst retaining sufficient recognition accuracy.

SUMMARY

The examples of the present invention that are described herein below provide systems and methods for providing a system for recognizing an arrangement of multiple objects on computing devices. In one example, the computing device may include a processor and at least one non-transitory computer readable medium for recognizing handwriting input under control of the processor. The non-transitory computer readable medium may be configured to determine with the medium at least one geometrical relationship between a plurality of recognized elements of the input and allocate with the medium the recognized elements having the at least one geometrical relationship therebetween to corresponding positions of an arrangement of the recognized elements. The positions of the arrangement may be cells of a two-dimensional structure of the recognized elements. The at least one geometrical relationship may be an overlap of the plurality of recognized elements in one or more directions of the arrangement.

The at least one non-transitory computer readable medium may also be configured to determine the overlap based on a comparison of a directional distance between one or more geometrical features of the plurality of recognized elements with at least one geometrical threshold. The at least one geometrical threshold may be based on at least one geometrical spacing of at least some of the recognized elements. The at least one geometrical spacing may also be a maximum spacing between components of the at least some of the recognized elements.

In another example, the present invention includes a method for recognizing an arrangement of multiple objects on computing devices. Each computing device may comprise a processor and at least one non-transitory computer readable medium for recognizing handwriting input under control of the processor. The method may comprise the steps of (i) determining, with the medium, at least one geometrical relationship between a plurality of recognized elements of the input, and (ii) allocating, with the medium, the recognized elements having the at least one geometrical relationship therebetween to corresponding positions of an arrangement of the recognized elements. The positions of the arrangement may be cells of a two-dimensional structure of the recognized elements. The at least one geometrical relationship may be an overlap of the plurality of recognized elements in one or more directions of the arrangement.

The method may further comprise the step of determining the overlap based on a comparison of a directional distance between one or more geometrical features of the plurality of recognized elements with at least one geometrical threshold. The at least one geometrical threshold may be based on at least one geometrical spacing of at least some of the recognized elements. The at least one geometrical spacing may be a maximum spacing between components of the at least some of the recognized elements.

In another example, the present invention includes a non-transitory computer readable medium having a computer readable program code embodied therein. The computer readable program code may be adapted to be executed to implement a method for recognizing an arrangement of multiple objects input to a computing device. The computing device may comprise a processor and at least one system non-transitory computer readable medium for recognizing handwriting input under control of the processor. The method comprises (i) determining, with the medium, at least one geometrical relationship between a plurality of recognized elements of the input, and (ii) allocating, with the medium, the recognized elements having the at least one geometrical relationship therebetween to corresponding positions of an arrangement of the recognized elements. The positions of the arrangement may be cells of a two-dimensional structure of the recognized elements. The at least one geometrical relationship may be an overlap of the plurality of recognized elements in one or more directions of the arrangement.

The method may further comprise the step of determining the overlap based on a comparison of a directional distance between one or more geometrical features of the plurality of recognized elements with at least one geometrical threshold. The at least one geometrical threshold may be based on at least one geometrical spacing of at least some of the recognized elements. The at least one geometrical spacing may be a maximum spacing between components of the at least some of the recognized elements.

BRIEF DESCRIPTION OF THE DRAWINGS

The present system and method will be more fully understood from the following detailed description of the examples thereof, taken together with the drawings. In the drawings like reference numerals depict like elements. In the drawings:

FIG. 10 shows an example of a handwritten input in the form of a 2×2 matrix in accordance with the present system.

FIG. 11A shows an example of a handwritten input in the form of a 3×3 matrix in accordance with the present system.

FIG. 11B shows an example of the recognized output of the handwritten input of FIG. 11A.

FIG. 14A shows another example of a handwritten input in accordance with the present system.

FIG. 14B shows an example of the recognized output of the handwritten input of FIG. 14A.

FIG. 15 shows yet another example of a handwritten input in accordance with the present system.

FIG. 19 shows an example of a handwritten input in accordance with the present system.

FIG. 20 shows an example of a handwritten input in accordance with the present system.

DETAILED DESCRIPTION

In the following detailed description, numerous specific details are set forth by way of examples in order to provide a thorough understanding of the relevant teachings. However, it should be apparent to those of ordinary skill in the art that the present teachings may be practiced without such details. In other instances, well known methods, procedures, components, and/or circuitry have been described at a relatively high-level, without detail, in order to avoid unnecessarily obscuring aspects of the present teachings. Reference to and discussion of directional features such as up, down, above, below, lowest, highest, horizontal, vertical, etc., are made with respect to the Cartesian coordinate system as applied to the input surface on which the input to be recognized is made.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
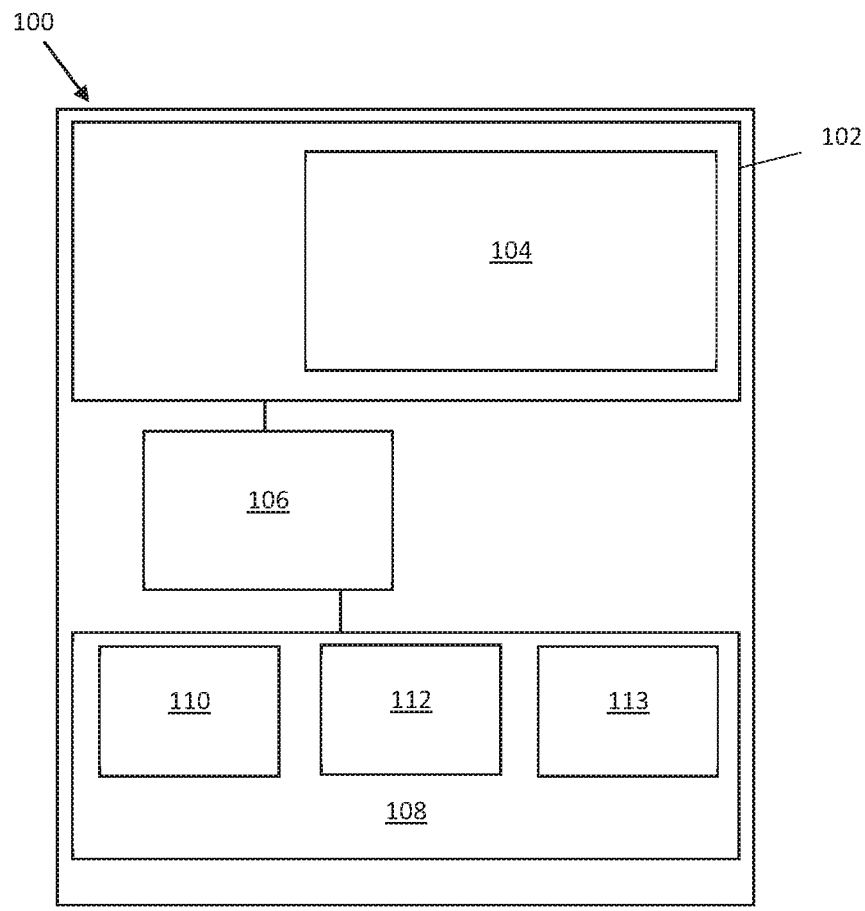
FIG. 1 shows a block diagram of a computing device in accordance with an example of the present system and method.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries. Instead of, or additional to, an on-board display, the computing device 100 may have a projected display capability. Alternatively, the computing device may include the input surface independent of, or without, a display. In the case of a device having no display, input made via the input surface is not displayed by the computing device, rather the device acts as an input device only with the recognized input (discussed later) used for control input, for example, or displayed as content on a connected device or dedicated display device.

The computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in memory 108 includes an operating system 110, an application 112 in the form of a non-transitory computer readable medium having a computer readable program code embodied therein, and a handwriting recognition (HWR) system 114, which may each include one or more separate computer programs, each of which has an ordered listing of executable instructions for implementing logical functions. The operating system 110 controls the execution of the applications 112 and the HWR system 114. The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the application 112 of the present system and method may be provided without use of an operating system.

The application 112 may be related to handwriting recognition as described herein, different functions, or both. The application 112 includes programs provided with the computing device 100 upon manufacture and may further include programs uploaded or downloaded into the computing device 100 after manufacture. Some examples include a text editor, telephone dialer, contacts directory, instant messaging facility, computer-aided design (CAD) program, email program, word processing program, web browser, and camera.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programming languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together or be combined as a single application. Further still, the application 112 and/or the HWR system 114 may be integrated within the operating system 110.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations as captured by the application 112 and/or HWR system 114. Further information such as timing, pressure, angle at a number of sample points along the path may also be captured to provide deeper detail of the strokes. Because different users may naturally write the same object, e.g., a letter, a shape, or a symbol, with slight variations, the present system accommodates a variety of ways in which each object may be entered whilst being recognized as the correct or intended object.

Figure 2:
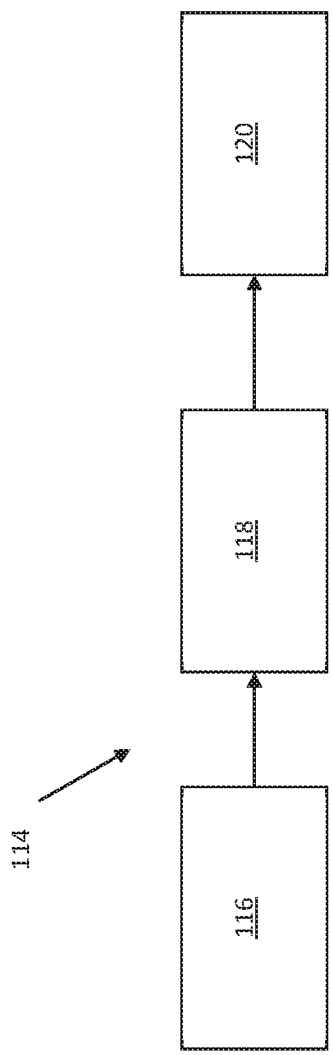
FIG. 2 shows a block diagram of a system for handwriting recognition in accordance with an example of the present system and method.

FIG. 2 is a schematic pictorial of an example of the HWR system 114. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
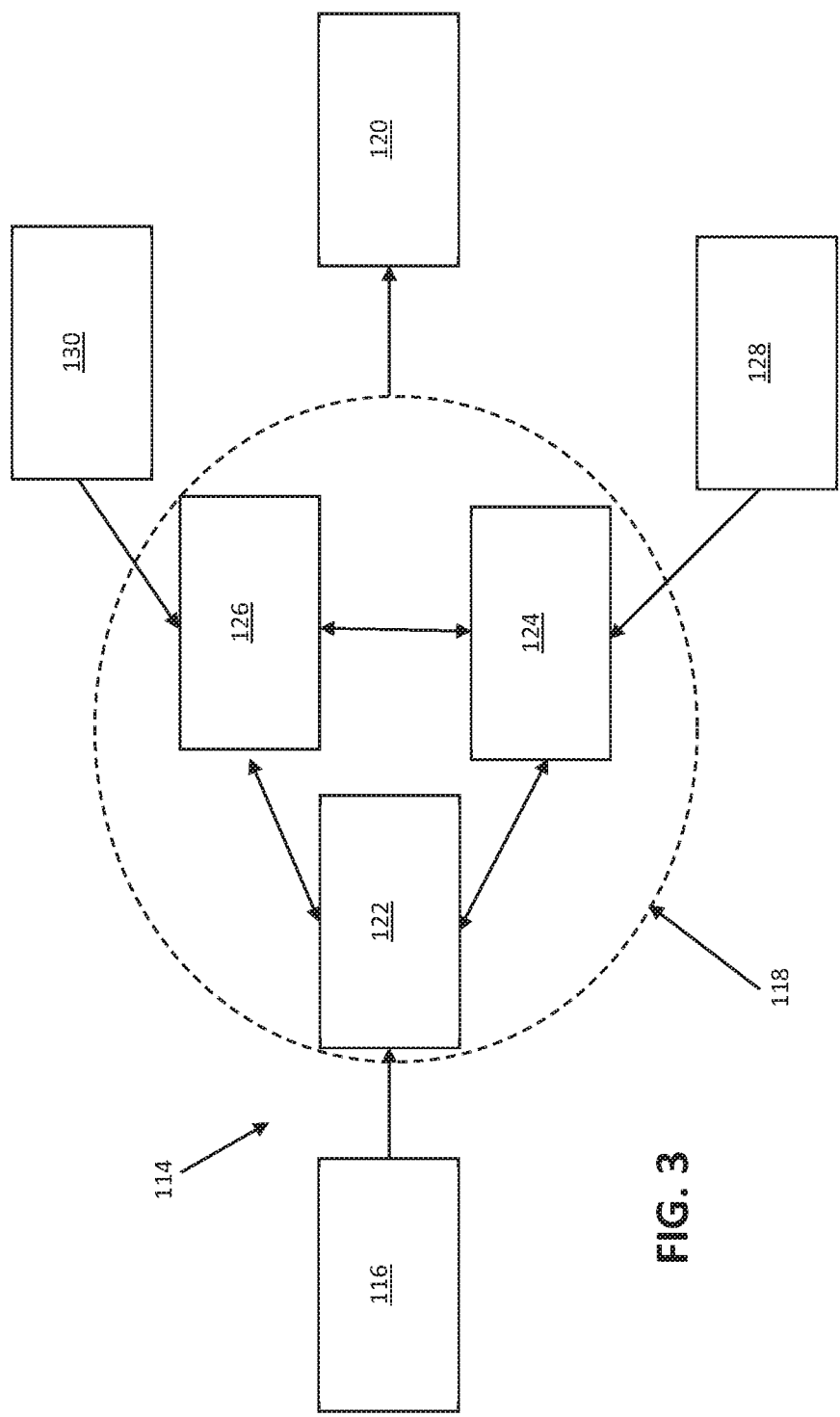
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts (segmentation expert 122, recognition expert 124, and language expert 126) are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., mathematical equations, words, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions, and provided to the linguistic expert 126. The language expert 126 aims at finding the best recognition path. In one example, the language expert 126 does this by exploring a language model such as final state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

The system and method described herein make use of the HWR system 114 in order to recognize handwritten input to the device 100. In particular, the present system and method recognizes content input within structures, such as matrices. A matrix is defined herein as the layout of several elements which are generally related, typically numbers, characters, symbols, mathematical expressions, in one or more rows and columns without the use of row and/or column designators, like lines and headers which may be present in a table, or dot points and numbers which may be present in a list, for example. Such matrices are typically used in mathematical operations, and may be input by one or more users of the device 100 in order to capture information and/or carry out such operations, either manually through the process of handwriting or automatically through capabilities of the application 112, for example, to provide mathematical solutions (discussed later).

Unlike the afore-discussed known systems for recognizing structured input, such as matrices, the present system and method do not require users to input specific content to enable the recognition, such as brackets, nor use processes which fail to recognize matrices having more complex elements, like equations, sub-matrices, ill-aligned elements and missing elements. Further, the known systems use geometrical projection to detect rows and columns and only process entire structures for recognition, whereas the present system and method may use incremental recognition and geometrical relationships of all elements without projection. These and other features of the present system and method are now discussed.

Figure 4A:
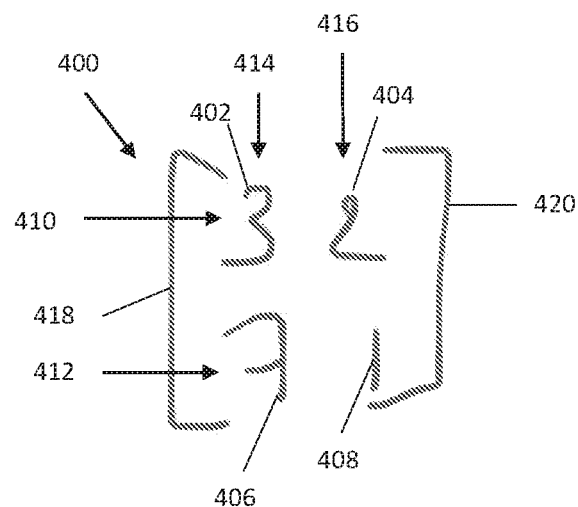
FIG. 4A shows an example of a handwritten input in the form of a 2×2 matrix in accordance with the present system.

FIGS. 4 to 20 illustrate various examples of handwritten or hand-drawn matrices, with some shown in typeset version also. FIG. 4A shows handwritten input which has been made onto the input surface 104 of the device 100, for example, rendered as a 2 by 2 (or 2×2; herein the standard use of 'number of rows'×'number of columns' is used) digital ink matrix 400. The matrix 400 has four content elements 402, being "3", 404 being "2", 406 being "7" and 408 being "1". The elements 402 and 404 are located in a first substantially horizontal line or row 410, the elements 406 and 408 are located in a second substantially horizontal line or row 412, the elements 402 and 406 are located in a first substantially vertical line or column 414, and the elements 404 and 408 are located in a second substantially vertical line or column 416. These content elements are contained within a first substantially vertical bracket or fence element 418 (e.g., on the left hand side of the first column 414) and a second substantially vertical bracket or fence element 420 (e.g., on the right hand side of the second column 414). The relative positions of the content elements in one or more rows and one or more columns provides a first characteristic of the matrix 400 based on at least one geometrical relationship of the recognized elements of the input and the containment of the content elements within one or more fence elements provides a second characteristic of the matrix 400.

Figure 4B:
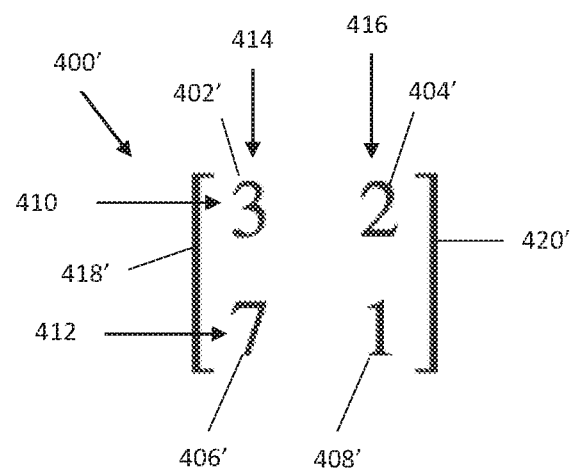
FIG. 4B shows an example of the recognized output of the handwritten input of FIG. 4A.

The application 112 of the present system and method detects the first characteristic either alone or in combination with the second characteristic in conjunction with the handwriting recognition performed by the HWR system 114 to determine that the input 400 is a matrix, and applies predetermined and/or user settable, e.g., via a user interface (UI) on the device 100, formatting to output a typeset matrix 400' as shown in FIG. 4B. As can be seen, the typeset matrix 400' has typeset versions 402' to 408' of the digital ink content elements 402 to 408, respectively, still arranged in the rows 410,412 and columns 414,416, and typeset versions 418' and 420' of the digital ink fence elements 418 and 420, respectively. Accordingly, the present system and method displays the recognized matrix 400 in a format that is expected by users for a digital version of a matrix, for example. It is understood, that the display format of the recognized matrix made be different, and may not necessarily be in 'typeset ink', but 'beautified' digital ink; that is, the display of digital ink is retained but the natural variations of handwriting are softened or normalized by modifying the relative positions of the elements, smoothing and/or normalizing the ink elements, such as the characters themselves, etc. Whether beautification is carried out in digital ink or typeset ink (e.g., the relative positions of the matrix elements are aligned), or both, users may be provided with feedback on the recognition of the matrix and its content, such as through a preview of the recognition result or elements thereof, such as display of brackets if not already input.

Figure 5A:
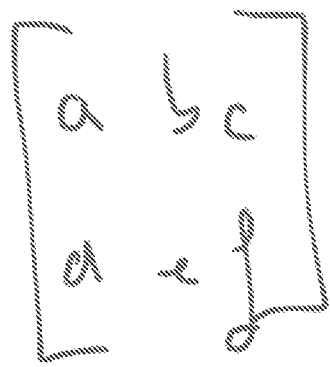
FIG. 5A shows an example of a handwritten input in the form of a 2×3 matrix in accordance with the present system.
Figure 5B:
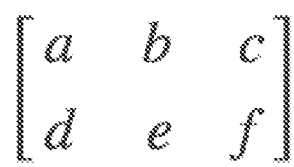
FIG. 5B shows an example of the recognized output of the handwritten input of FIG. 5A.
Figure 6:
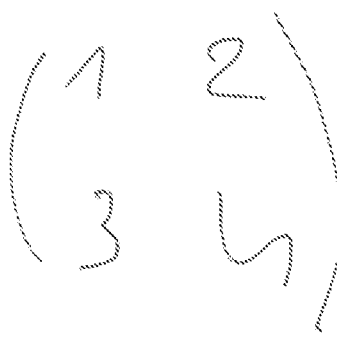
FIG. 6 shows an example of a handwritten input in the form of a 2×2 matrix in accordance with the present system.

The input of FIG. 4 is a relatively simple example of a matrix with single digit numbers as content elements relatively well-aligned in rows and columns and with relatively clear fences around that content. FIG. 5A shows a similarly simple 2×3 digital ink matrix rendered from handwritten input but with alphabetic content elements. FIG. 5B shows the recognized output of the present system and method as a typeset matrix. Like FIG. 4, the input of FIG. 5 is a relatively simple example of a matrix with single alphabetic characters as content elements relatively well-aligned in rows and columns and with relatively clear fences around that content. FIG. 6 shows a similarly simple 2×2 digital ink matrix rendered from handwritten input with single digit numbers as content elements relatively well-aligned in rows and columns but surrounded or contained by differently shaped fence elements, e.g., round brackets instead of square brackets are used. The present system and method is configured to recognize these different, and other, fence forms in order to assist in the detection of matrix input. It is noted that while a fence element is the secondary characteristic of a matrix, other structures having a primary characteristic of content in rows and/or columns have similar secondary characteristics, such as drawn vertical and/or horizontal lines in tables, for example. Further, recognition of the first characteristic of the input matrix alone, that is without consideration of the second characteristic (e.g., fence elements may not even be present), may be sufficient for such detection, as described in detail later.

Figure 7:
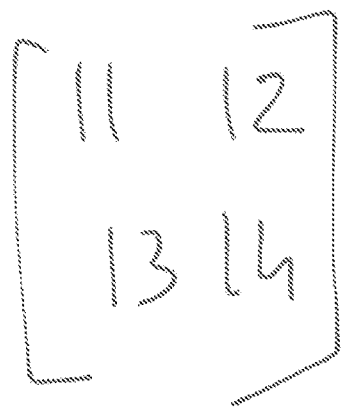
FIG. 7 shows an example of a handwritten input in the form of a 2×2 matrix in accordance with the present system.

A slightly more complex example of a handwritten matrix is shown in FIG. 7, where the input 2×2 matrix has double digit numbers as content elements with at least one slightly misaligned column, e.g., the left-hand column. This slight misalignment coupled with the spaces between the digits of each double digit element provide a challenge for correct recognition of the matrix being a 2×2 matrix, since one or more of the spaces may be considered as spaces between columns rather than between components of double digits, and as such it is conceivable that without robust recognition rules, the matrix of FIG. 7 could be detected as a 2×5 matrix of single digit elements (e.g., the "1" s of the "11", the "1" and "2" of the "12", the "1" and "3" of the "13" and the "1" and "4" of the "14" are treated separately with the first "1" of the "11" allocated to the first column, the second "1" of the "11" and the "1" of the "13" allocated to the second column, the "3" of the "13" allocated to the third column, the "1" of the "12" and the "1" of the "14" allocated to the fourth column, and the "2" of the "12" and the "4" of the "14" allocated to the fifth column. Similar results of course can occur for larger numbers. If such an incorrect recognition is made, then the consequential beautified output of the recognition would display a recognized matrix which is quite different to that intended by the user and/or any subsequent use of the data re). The present method and system employs criteria to minimize the occurrence of such incorrect matrix recognition caused by over-segmentation of the content elements which returns more columns than applicable to the matrix, which is described in detail later.

Figure 8:
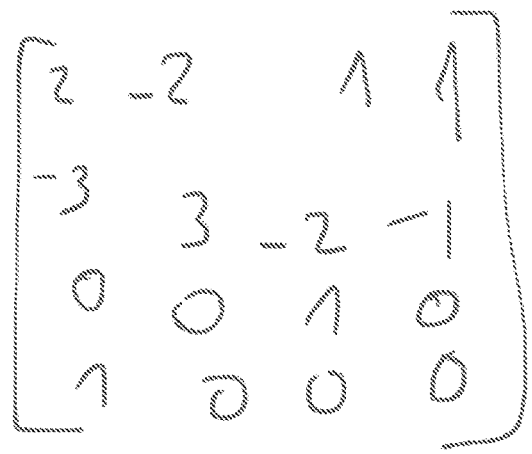
FIG. 8 shows an example of a handwritten input in the form of a 4×4 matrix in accordance with the present system.
Figure 9:
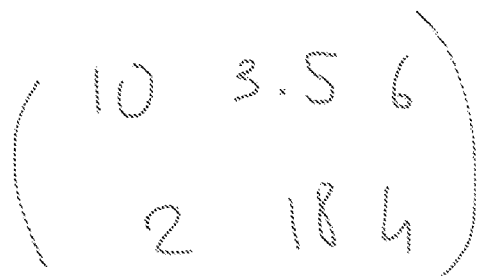
FIG. 9 shows an example of a handwritten input in the form of a 2×3 matrix in accordance with the present system.

Other content element forms also provide a challenge, with or without apparent misalignment. For example, FIG. 8 shows a handwritten matrix having content elements as single digit numbers where some have designators, e.g., minus signs, which designate a mathematical meaning to those content elements. Such designators may be formed by a wide variety of symbols, marks or characters, and like for the large(r) number example of FIG. 7, the over-segmentation of the content elements would result in these designators being allocated into columns separate from the content which they designate. Similar issues apply also to numerical content elements involving decimals as shown in the example matrix of FIG. 9, and fractions as shown in the example matrix of FIG. 10.

Minimization of incorrect recognition for such matrix input is provided in the present system and method by taking the recognition of the content elements themselves into account in the matrix detection process of the application 112. That is, for the example matrix of FIG. 8 the HWR system 114 recognizes the designators as minus signs connected to the numbers on the immediate right hand side thereof forming "−1", "−2" and "−3", for example, such that the application 112 treats these as a single content element each, for the example matrix of FIG. 9 the HWR system 114 recognizes the decimal point between adjacent numbers forming "3.5", for example, such that the application 112 treats this as a single content element, and for the example matrix of FIG. 10 the HWR system 114 recognizes the divider line between adjacent numbers forming the fraction "¼", for example, such that the application 112 treats this as a single content element. The manner in which the present system and method takes the recognition results into account for content structure detection is described in detail later.

Other matrix types include a mixture of content element types, such as numbers or alphabetic characters, and still other matrix content element types include abstract mathematical forms, such as subscripts and superscripts. For example, FIG. 11A shows a handwritten matrix having both numerical content elements, being "0", and alphanumeric content elements having alphabetic characters designated with subscript numerals. Similar to the designator examples of FIGS. 8 to 10 described above, by taking the recognized content into account, e.g., the HWR system 114 recognizes the subscripts connected to the numbers on the immediate left hand side thereof forming "$a_{11}$", "$a_{22}$" and "$a_{33}$", the application 112 provides the recognized matrix shown in FIG. 11B displayed in typeset ink, since the subscripts are treated as part of a greater content element and not as an entire content element themselves.

Figure 12:
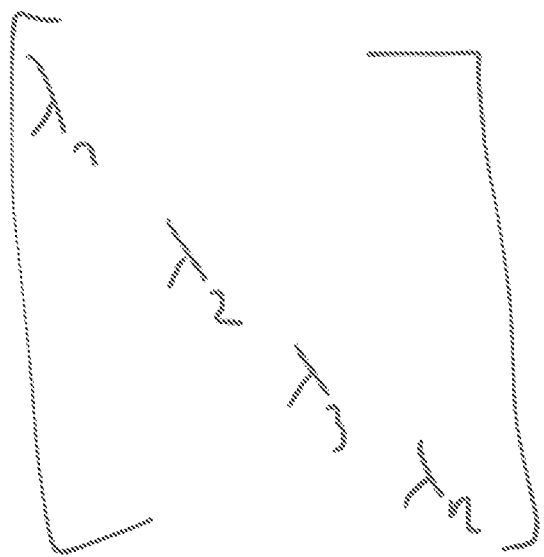
FIG. 12 shows an example of a handwritten input in the form of a 3×3 matrix in accordance with the present system.

FIG. 12 shows a similar example input matrix with content elements including subscripts. However, unlike the earlier examples, the matrix of FIG. 12 also includes empty content element positions or cells. That is, each row and column position is considered as a cell, such that the content element position at the first row (e.g., identified as row 0, say) and the first column (e.g., identified as column 0, say) corresponds to "cell 0,0", for example. Other forms of identifying matrix element positions are possible however. Further, the application 112 and/or HWR system 114 may apply such identifiers to the recognized content as positional data, such as data tags, stored in the memory 108 of the device 100, for example. The presence of such empty cells can cause another challenge for the proper recognition of two-dimensional structured content, such as matrices, since the identification of the rows and columns of the structure is conceivably only ascertainable through the consideration of elements from other rows and/or columns, not from within the same row and/or column of the element under consideration. For example, an element in an otherwise empty row (or column) is not aligned with any other element and therefore the identification of the row (or column) is made by considering non-aligned elements. The present system and method provides robust matrix detection even in such content scenarios, as described in detail later.

Figure 13:
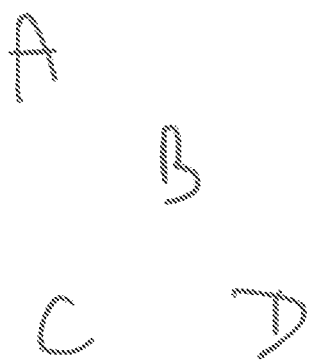
FIG. 13 shows an example of a handwritten input in accordance with the present system.

As described earlier, the presence of fence elements can be used to assist the recognition of a matrix, particularly when empty cells are present. This is because, if the presence of fence elements is interpreted to mean that the content surrounded, contained or otherwise adjacent (e.g., in a single fence scenario) the fence element(s) is laid out in one or more rows and one or more columns, the empty cells are considered as part of such row(s) and/or column(s) rather than as non-content. However, as also described earlier, the present system and method is capable of recognizing two-dimensional content structures without the presence or aide of structural indicators, such as fence elements for matrices. For example, FIG. 13 shows an example input matrix with empty cells, like the example of FIG. 12, but unlike FIG. 12 no fence elements are present. The present system and method still correctly identifies the row and column structure of FIG. 13, however the recognition result may or may not be identified as a matrix. That is, it may just be identified as two-dimensional structure, which may not have any practical consequential effect depending on any subsequent use of the recognition result. Even in such a case, selection by users to designate the recognized structure as a matrix may be provided, via the UI or the like, and/or through feedback or preview of the recognition result, such as the display of generated digital or typeset ink fence elements about the displayed content elements, for example. Such features of the present system and method are described in detail later.

Still further complexity in two-dimensional structures is possible. FIG. 14A shows the example 2×3 digital ink matrix of FIG. 5A with additional input. In particular, a 3×2 handwritten matrix is input to the immediate right of the 2×3 matrix followed by an equals sign, "=", and a further matrix which includes two mathematical equations. As can be seen, the right-most matrix includes the partial result of the multiplication of the first two matrices, that is the product of row 0 of the 2×3 matrix and column 0 of the 3×2 matrix, and the product of row 1 of the 2×3 matrix and column 1 of the 3×2 matrix, where the full result would form an expected 2×2 matrix. FIG. 14B shows the recognized output in typeset form, and as can be seen the equations of the third matrix are properly recognized as belonging to cell 0,0 and cell 1,1 of a 2×2 matrix. This recognition results despite relatively significant overlap of the handwritten equations, as shown in FIG. 14A. As described earlier, this recognition is achieved by the present system and method through consideration of the recognition of the equations within the rows of third matrix and may also be recognized through consideration of the whole recognized content, e.g., the expected 2×2 matrix resulting from the product of a 2×3 matrix and a 3×2 matrix. These features are described in detail later.

Figure 16:
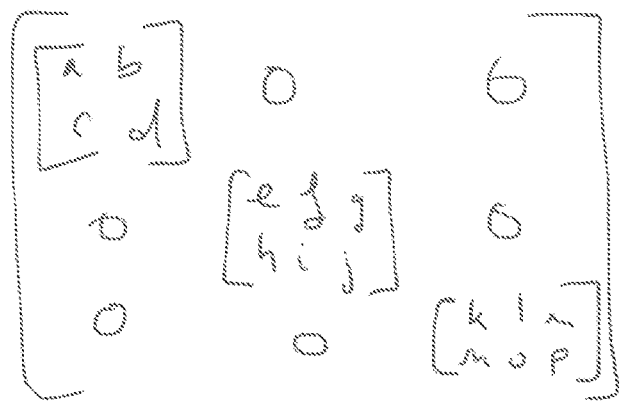
FIG. 16 shows an example of a handwritten input in the form of a 3×3 matrix with nested matrices in accordance with the present system.

By treating the content elements as belonging to cells of the two-dimensional structure with regard to the one or more recognized elements of each content element based on the recognition result from the HWR system 114, rather than treating individual input elements individually to determine cell allocations, the present system and method is able to substantially accurately detect even more complex matrix forms. For example, FIG. 15 shows an example handwritten 2×2 matrix with each content element including relatively complex mathematical functions combining many of the afore-described content features, e.g., alphabetic characters, words, numbers, superscripts, brackets, symbols, and designators, such as a minus sign and divider lines. However, despite this complexity the present system and method detects the 2×2 matrix since the recognized composite parts of each recognized function is treated as a single content element belonging to a corresponding matrix cell. Further, FIG. 16 shows an example handwritten 3×3 matrix which includes nested matrices, e.g., cell 0,0 includes a 2×2 sub-matrix, cell 1,1 includes a 2×3 sub-matrix and cell 2,2 includes a 2×3 sub-matrix.

Figure 17:
FIG. 17 shows an example of a handwritten input in the form of a 1×3 matrix in accordance with the present system.
Figure 18:
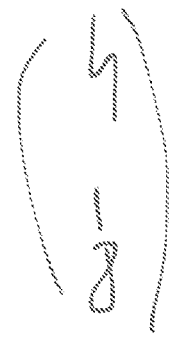
FIG. 18 shows an example of a handwritten input in the form of a 3×1 matrix in accordance with the present system.

While relatively complex matrices present a challenge for detection and recognition, overly simple matrices, such as single row or single column matrices, also present a challenge. FIG. 17 shows an example 1×3 handwritten matrix and FIG. 18 shows an example 3×1 handwritten matrix. In either case since (similar to the empty cell issue discussed earlier) there is no inter-row relationship for the 1×3 matrix or inter-column relationship for the 3×1 matrix it may be difficult to determine the presence of multiple columns (or rows). This is because, only the content elements within that row or column itself are considerable for determining columns or rows, and as such the values of the distances or spaces between those elements in relation to set thresholds or the like for column or row determination are critical to that determination. Basically, less information is available such that determination is more problematic.

For example, in FIG. 17 depending on the threshold set for column determination, the content may be recognized as a 1×3 matrix with content elements "3", "7" and "2", or a 1×2 matrix with content elements "3" and "72", or not a matrix at all with content "372". Likewise, in FIG. 18 depending on the threshold set for row determination, the content may be recognized as a 3×1 matrix with content elements "4", "1" and "8", or a 2×1 matrix with content elements "4" and "18", or not a matrix at all with (vertically disposed) content "418". As discussed earlier, the secondary characteristic of a fence element(s) may assist with matrix detection per se, such that the no matrix result does not occur, but this does not inform the application 112 as to the internal structure of the matrix. In the present system and method, a further (or third or tertiary characteristic) can be considered with respect to certain content types to assist in this determination. For example, the space required between input elements, such as numbers, for columnar identification may be set to be less than for other input elements, such as alphabetic characters, for example. This is because, for numbers it is considered that they should be written reasonably close together when multi-digit numbers are specified. Such a criteria can also assist in more complex matrix detection, like in the example of FIG. 7. Alternative, or additional, characteristics are also taken into account to properly detect such simple matrices as well as more complex matrices, which are discussed in detail later.

Furthermore, as discussed earlier, other forms of two-dimensional structures are also recognizable by the present system and method. For example, FIG. 19 shows a mathematical function involving a determinant of a matrix, which like a matrix has rows and columns of elemental cells. FIG. 20 shows such determinants nested within a matrix. Further, as can be seen (like some of the earlier examples) additional elements external to the two-dimensional structures may also be present, such as mathematical operators and functions. While such additional elements are recognized separately from the content of a matrix, for example, they may be used as context by the application 112 and/or HWR system 114 in order to guide recognition of the matrix content and the structure of the matrix, such as discussed above, for example.

As can be seen from the afore-described examples, the natural variation in hand-drawn matrices is wide and as such a system which robustly determines structural relationships, like these matrices, must be able to generally perform detection and recognition over this wide range of variations. Of course, some limits apply as to what should be correctly recognized as a matrix, for example, so that the general definition is adhered to. The present system and method therefore uses criteria and the results of recognition for correct detection of matrix structures as described below. It is noted that typically handwriting recognition only takes geometric relationships of recognized elements into account for recognition of these elements themselves, not the structure within which those elements are input. Accordingly, the present system and method uses further information to provide this recognition using a probability based approach which takes into account geometrical and language model features to provide coarse filtering of row and column candidates. These coarsely filtered matrix cell candidates may then be fine filtered using the results of the recognition process to recognize the actual matrix. In this way, the present system and method makes efficient use of recognition to detect matrices by pro-processing matrix element candidates. It is understood that the present system and method is applicable to recognition of other structural relationships of handwritten content in which the content is generally aligned in (horizontal or non-horizontal, e.g., diagonal) rows and (vertical or non-vertical, e.g., diagonal) columns such as tables, lists, etc., since the recognition of the structure is not reliant of specifically input indicators for the structure, but rather the relative geometry of the recognized content itself. These and other features of the present system and method are now discussed.

The following description of the examples illustrated in FIGS. 21 to 37 is directed to matrix recognition, however similar description applies to recognition of other structures as described above. Further, the following description is related to column detection within an input matrix, however as will be apparent the same process may be used to detect rows also, such that the cells of the matrix are detected. In either case, the process generally involves detecting alignments of elements in the substantially horizontal and vertical directions (or directions otherwise based on the direction of writing), using the recognition of the elements belonging to those alignments to provide detection of possible columns or rows of the matrix and recognition of the elements themselves. The process of row detection is performed before column detection in order to provide matrix cell detection, and therefore overall detection of a matrix. In the below described examples, the alignments are detected as part of detecting the candidate matrix columns and rows, and then the candidate columns and rows are analyzed based on the recognized content to provide the recognized matrix output. Alternatively, the detection of either the vertical and/or horizontal alignments may be performed in a different manner separate from the matrix row and/or column hypothesizing, such as by the process of detecting multi-lines, e.g., multi-equations described in United States Patent Application Publication No. 2017/0011262 titled "System for Recognizing Multiple Object Input and Method and Product for Same" filed in the name of the present Applicant and Assignee, the entire content of which is incorporated by reference herein.

Figure 21:
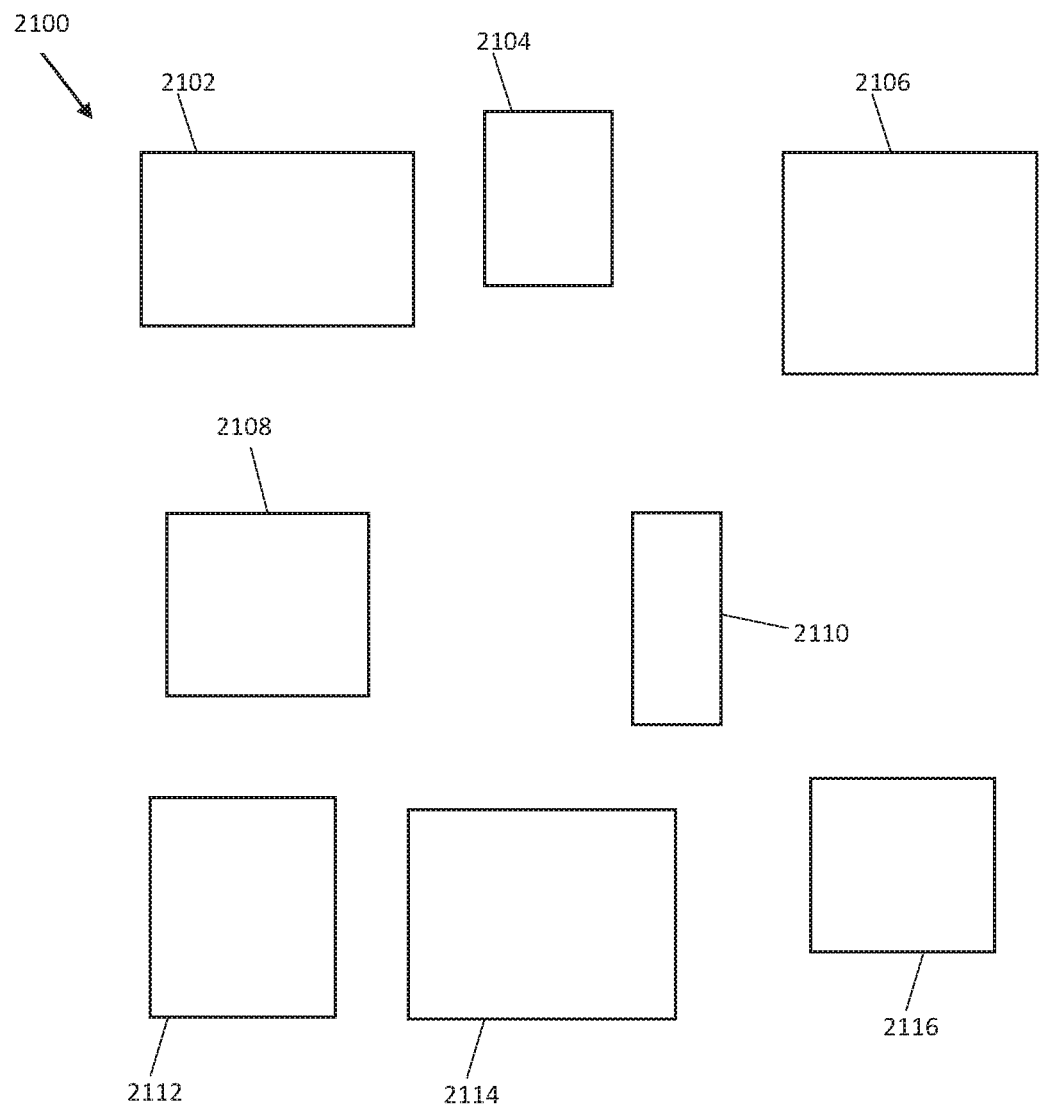
FIGS. 21-31 show an example of matrix recognition in accordance with the present system.

FIG. 21 shows an example arrangement 2100 of multiple input ink objects 2102 to 2116. The ink objects represent handwritten input elements (e.g., one or more strokes forming one or more characters, symbols, etc.) input to the input surface 104 of the device 100, for example, and rendered as digital ink thereon. The ink objects are generally illustrated as rectangles which correspond to the extent of the handwritten elements, and as such may represent bounding boxes of the elements as recognized by the HWR system 114. At this point of the matrix detection process the content of the ink objects itself is not necessarily important rather it is the correspondence of the ink objects to recognized elements that is used by the process. It is noted that in the recognition process of the HWR system 114 the recognition result contains a hierarchical determination of recognition candidates for each stroke and groups of the strokes based on the language model employed. The ink objects shown relate to the most probable candidate of each recognized element, however the actual recognized content and therefore the recognized elements may change if different candidates are selected, for example, by users through the UI or the like, such that the arrangement itself changes. In such a case, the matrix detection process is at least partially used again to adapt to the changed arrangement, e.g., at least for that part of the arrangement which is changed.

As can be seen, in the arrangement 2100 the ink objects 2102, 2104 and 2106 are generally horizontally aligned with one another, the ink objects 2108 and 2110 are generally horizontally aligned with one another, and the ink objects 2112, 2114 and 2116 are generally horizontally aligned with one another. As such these horizontal alignments are detected by the present system and method in the manner described earlier, and in the illustrated example would most likely be determined as corresponding to potential matrix rows since no overlap between elements of the alignments is present. Further, the ink objects 2102, 2108 and 2112 are generally vertically aligned with one another, the ink objects 2104, 2110 and 2114 are generally vertically aligned with one another, and the ink objects 2106 and 2116 are generally vertically aligned with one another. As such these vertical alignments may be detected by the present system and method, and in the illustrated example may be determined as corresponding to potential matrix columns. Accordingly, the arrangement 2100 may be detected as corresponding to a 3×3 matrix, for example. The potential columns of such a matrix are detected as in the following examples of FIGS. 22 to 31.

Figure 22:
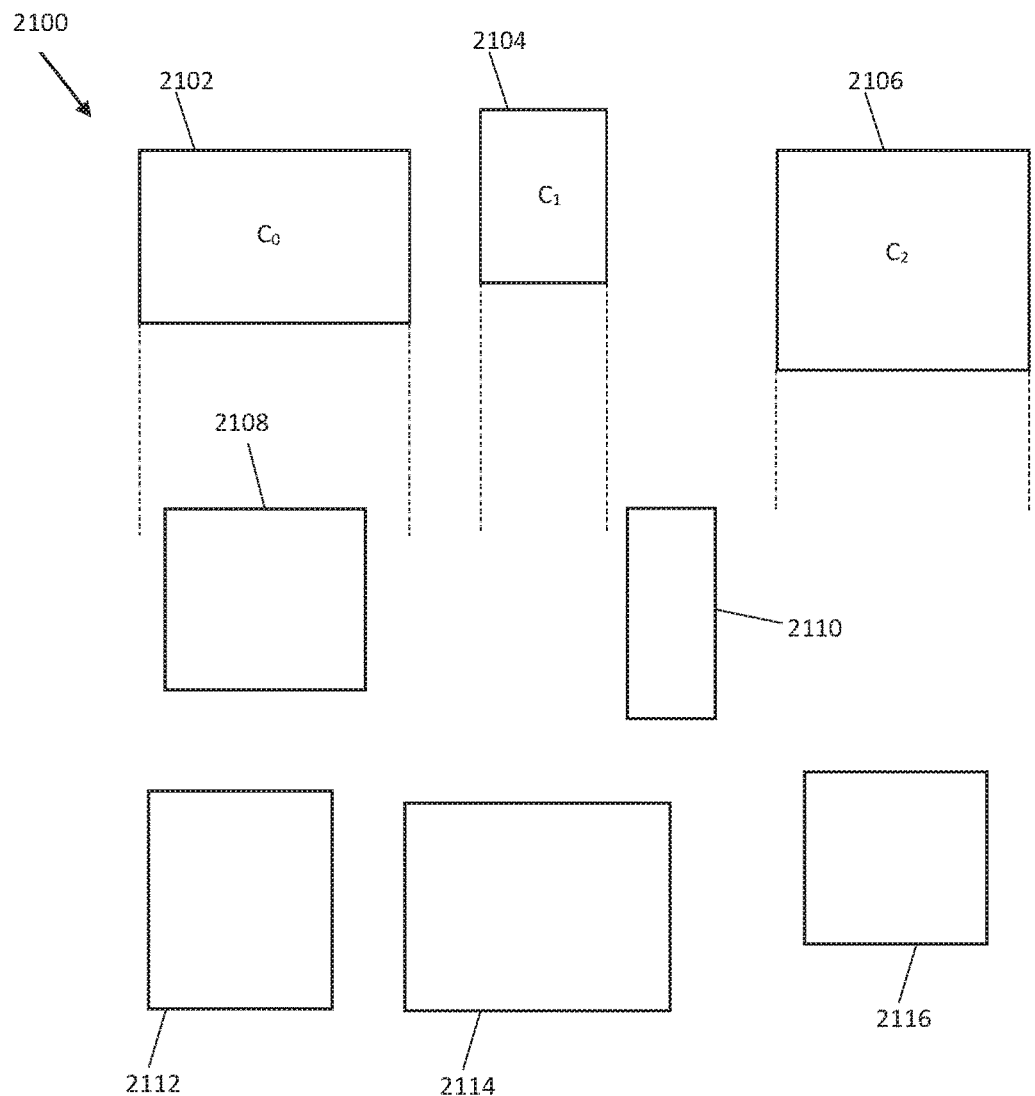

As shown in FIG. 22 it is known that the objects 2102, 2104 and 2106 are substantially horizontally aligned, and from the recognition result of the HWR system 114, it is known that the objects are (likely) separate content elements. Accordingly, the objects 2102, 2104 and 2106 are allocated by the application 112 into separate potential first, second and third columns $C_0$, $C_1$ and $C_2$, respectively. The hypothesis of these column allocations is tested by considering whether any ink objects in the next horizontal alignment (in the present example in the downward direction) overlap vertically with the ink objects of the columns. That is, it is determined whether any ink objects overlap with the width of each of the ink objects 2102, 2104 and 2106 by projecting the extents of these objects into the next horizontal line or row. This basically accords with checking whether the ink objects 2108 and 2110 overlap with the ink objects 2102, 2104 and 2106 in the vertical direction. In FIG. 22 this is depicted by dashed line projections of the right hand and left hand boundaries of the bounding boxes of the ink objects 2102, 2104 and 2106. As can be seen, it is determined that the ink object 2108 overlaps with the ink object 2102, but the ink object 2110 does not overlap with any of the ink objects 2102, 2104 and 2106. Accordingly, in FIG. 23 it is shown that the ink object 2108 is allocated into the first column $C_0$ with the ink object 2102, the ink object 2104 remains allocated into the second column $C_1$, the ink object 2110 is allocated into the third column $C_2$ (which is adjusted from the allocation depicted in FIG. 22), and the ink object 2106 is allocated into a fourth column $C_3$.

Figure 23:
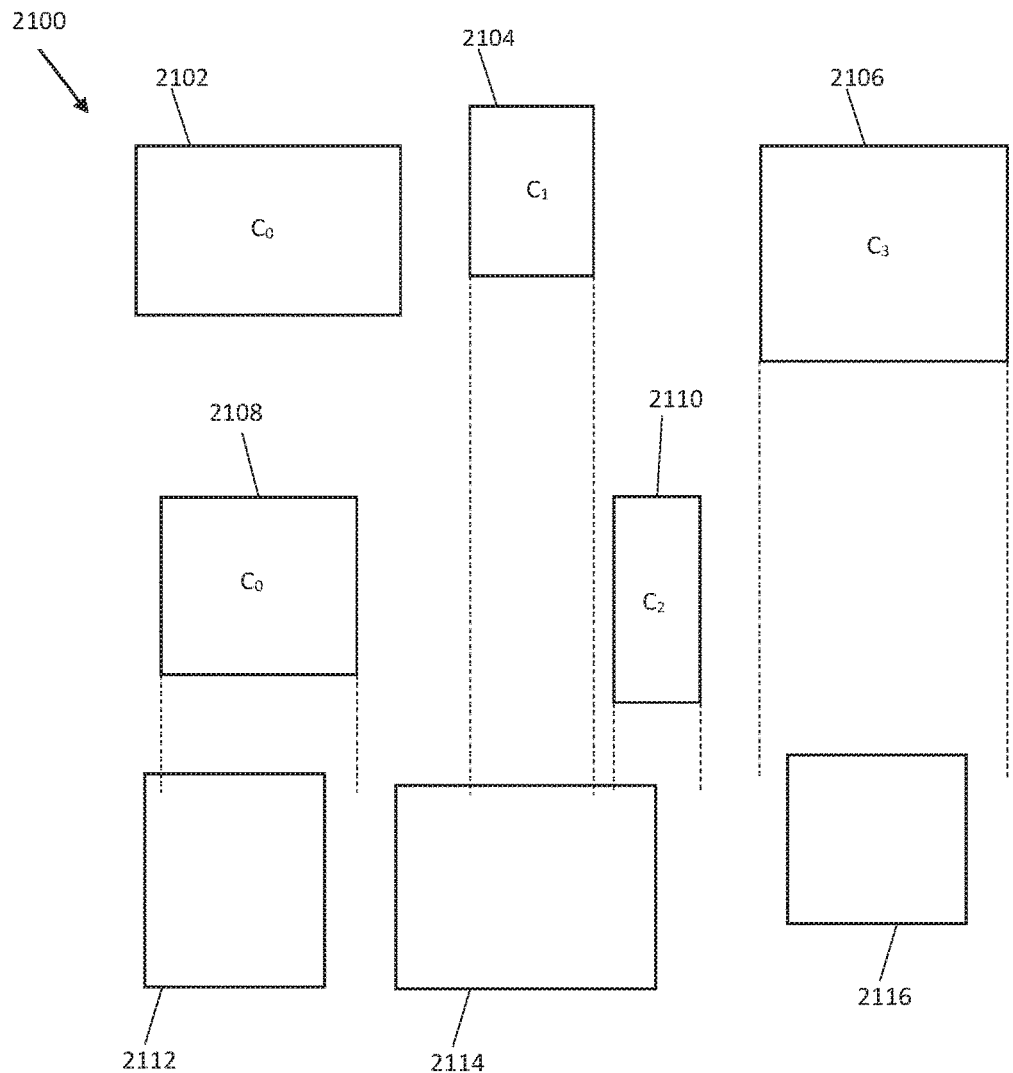

Next, the hypothesis of these column allocations is again tested by considering whether any ink objects in the next horizontal alignment overlap vertically with the ink objects of the columns. That is, it is determined whether any ink objects overlap with the width of each of the ink objects 2108, 2104, 2110 and 2106 by projecting the extents of these objects into the next horizontal line or row. This basically accords with checking whether the ink objects 2112, 2114 and 2116 overlap with the ink objects 2102, 2104 and 2106 in the vertical direction. In FIG. 23 this is depicted by dashed line projections of the right hand and left hand boundaries of the bounding boxes of the ink objects 2108, 2104, 2110 and 2106. As can be seen in FIG. 23, it is determined that the ink object 2112 overlaps with the ink object 2108, the ink object 2114 overlaps with both of the ink objects 2104 and 2110, and the ink object 2116 overlaps with the ink object 2106. Accordingly, in FIG. 24 it is shown that the ink object 2112 is allocated into the first column $C_0$ with the ink objects 2102 and 2108, the ink object 2114 is allocated into the second column $C_1$ with the ink object 2104, the ink object 2110 is re-allocated into the second column $C_1$ as well, and the ink object 2116 is allocated into the third column $C_2$ with re-allocation of the ink object 2106 from the fourth column depicted in FIG. 23. This recognition result of likely columns is depicted in FIG. 25 in which the respective boundaries of the three columns $C_0$, $C_1$ and $C_2$ are illustrated as dashed bounding boxes surrounding the ink objects allocated into those columns.

Figure 24:
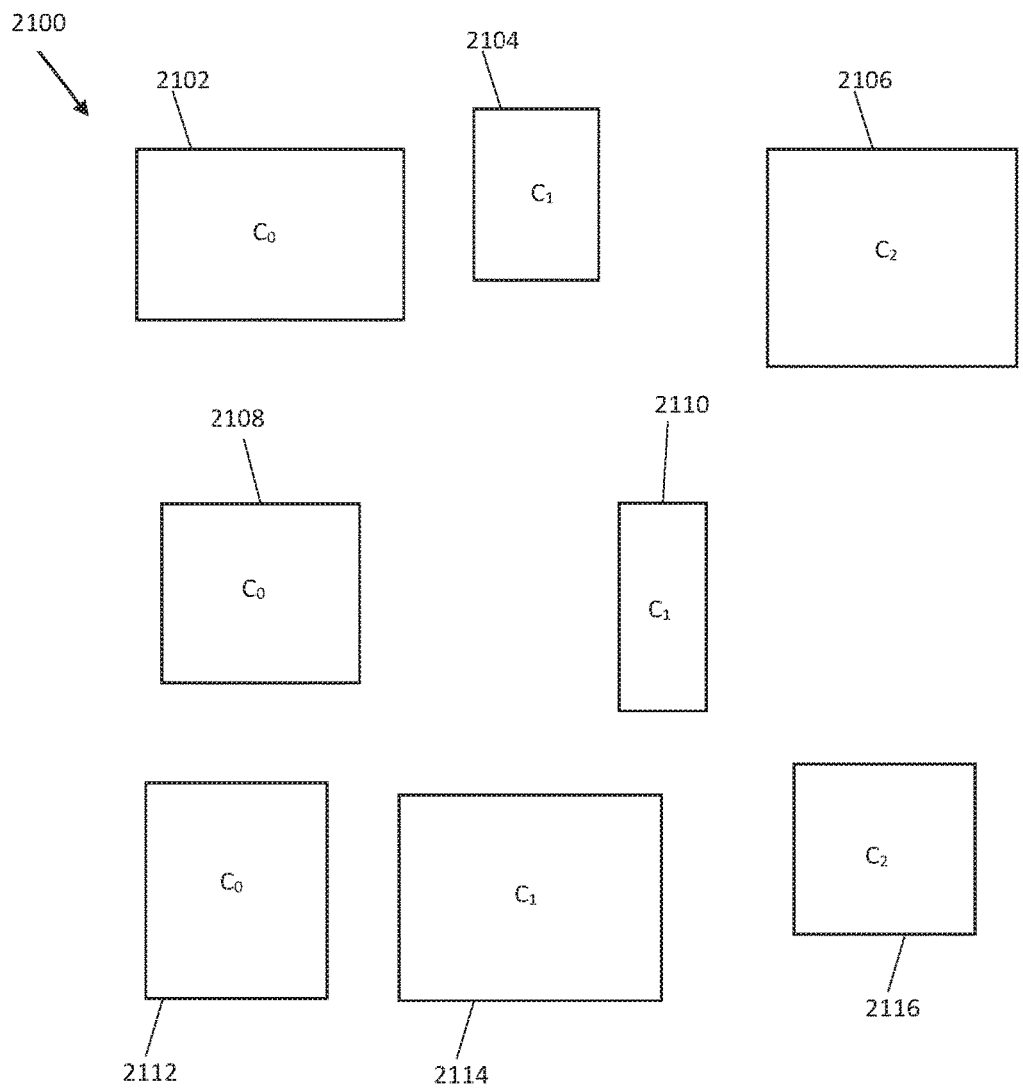
Figure 25:
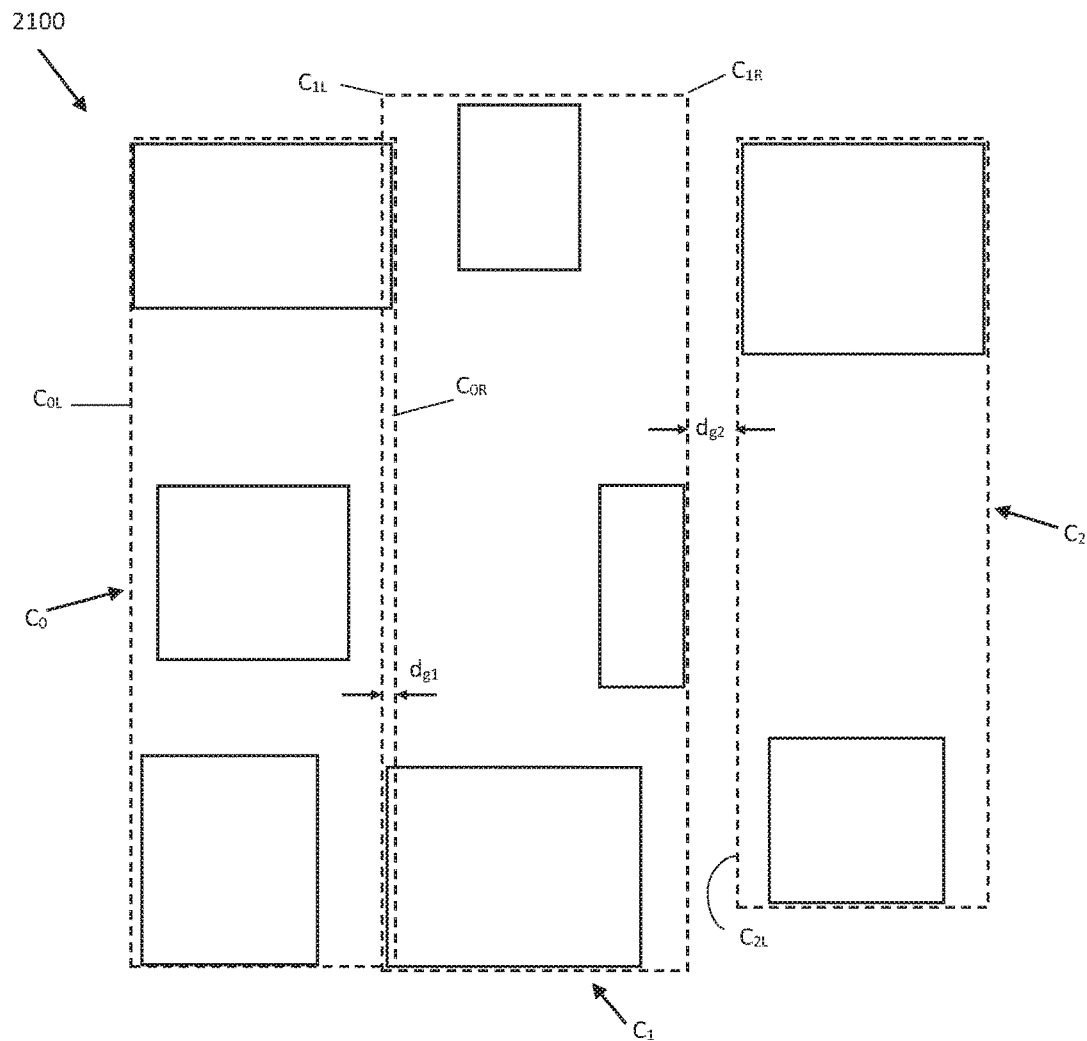

The re-allocation of columns depicted in FIG. 24 basically represents a type of fine filtering of the column detection of the present system and method, in which the detection of columns converges as closer and closer spaced content elements are considered on a row-by-row basis. This filtering may not be performed at this stage however, and all potential columns found in each step may be retained until a subsequent filtering step, which checks whether any columns should be merged. Such processing is described in detail later.

Once all possible hypotheses have been determined and tested, the application 112 may provide (meta)data to the ink objects, such as a tag indicting the row and column allocations, e.g., the cell allocations, recognized for the ink objects, where such data is stored with the ink objects in the memory 108 of the device 100, for example. In this way, in any subsequent interactions with the ink objects, such as typesetting or editing, the positional relationships between the objects can be taken into account.

The above-described iterative approach of hypothesizing and testing column allocations row-by-row and through consideration of spatially adjacent content elements in those rows basically corresponds to iteratively considering 2×2 arrangements of objects across the entire arrangement in order to find potential columns. That is, the relative positions of two adjacent content elements in a first row are compared to two adjacent content elements in the next (second) row to determine (and adjust) column allocations. This can be performed in a number of ways. In one example, relative distances between features of the content elements are compared to a threshold to determine if the elements are potentially separated into different columns. That is, a suitable column spacing is searched for between these elements.

For example, in the present case the first column hypothesis tested is that the ink object 2102 is in a first column and the next ink object of that row, i.e., the ink object 2104, is in a second column, the second column hypothesis tested is that the ink object 2102 is in the first column and the leftmost ink object of the next row, i.e., the ink object 2108, is in the second column. This can be done by considering whether the horizontal distance between the right hand boundary of the bounding box of the ink object 2102 and the left hand boundary of the bounding boxes of the ink objects 2104 and 2108, say, is greater than a (first) threshold. The first threshold at its simplest is set to zero, or some non-zero (e.g., positive) value, such that any object which overlaps vertically with the object under consideration returns a negative distance. That is, measured distances like the distance between the objects 2102 and 2014 yield a positive value which is greater than the first threshold and measured distances like the distance between the ink objects 2102 and 2108 yield a negative value which is less than the first threshold. Accordingly, the application 112 correctly determines that it is likely that the ink objects 2102 and 2104 belong to different columns and the ink objects 2102 and 2108 do not belong to different columns.

The intra-row comparison is basically the horizontal line determination described earlier and the inter-row comparison is basically the projection of the higher leftmost object onto the next successive horizontal line described earlier, where this projection essentially forms the fourth element of the 2×2 arrangement being tested. It is understood that the ink objects may be defined by a different characteristic than the bounding box, such as the extent of the strokes themselves, a mean center or barycenter of the strokes making up each element, etc. Further, the distance may be measured in terms of pixels, as a function of some other parameter of the input surface 104, like a guide for writing, such as an input line pattern or the like as described for example in United States Patent Application Publication No. 2017/0060819 titled "System and Method of Digital Note Taking" filed claiming a priority date of Aug. 25, 2015 in the name of the present Applicant and Assignee, the entire content of which is incorporated by reference herein, in terms of characteristics of the input itself, like average or mean dimensions of the handwritten objects, such as characters, the bounding boxes, etc., or a combination of such features or the like. Further still, it is understood that the iterative approach may be based on time order of entry of the strokes/elements rather than spatial order, as described above, or some combination thereof.

As such, the iterative 2×2 arrangement of objects is considered across the entire arrangement in order to find potential columns. In this way, localized variations in the handwritten elements of the arrangement are locally considered such that they do not influence the overall column detection across the entire arrangement. That is, the Applicant has found that users of digital applications for the handwritten input of two-dimensional structures, such a matrices, tend to skew the spacing of the structural elements as the dimensions of the structure increase, particularly in regular matrices, e.g., in which elements are of the same type. For example, for a simple 2×2 matrix, the relative spacing and sizing of the elements is reasonably consistent, e.g., like in FIG. 4, whereas, as the matrix grows, certain local compression or extension of element spacing may result, e.g., like in FIG. 8 where the spacing of the elements toward the upper right hand corner is expanded and the spacing of the elements in the lower center is slightly compressed and misaligned horizontally compared to the elements at the upper left hand corner of the matrix, which is the starting position of writing.

The above-described spatial order approach is generally applicable to post-processing of the input, that is, once the user has handwritten all intended input of the matrix processing to recognize the matrix is performed through manual selection of a control element, like a menu button, or input of a gesture, like a multi-point touch on the interface surface such as a double tap, or through automatic processing, like the lapsing of a set amount of time after input, e.g., about half a second to about two seconds. Such a spatial approach is also applicable to processing during input, so-called incremental recognition, by using such triggers. The temporal approach is also applicable to either incremental or post-recognition processing. It is noted that the incremental approach using spatial and/or temporal considerations may decrease the processing time for final recognition of the input, for example, when the user indicates that conversion to typeset is desired or after a set time lapse since last input, since much of the processing has been performed during input.

Figure 26:
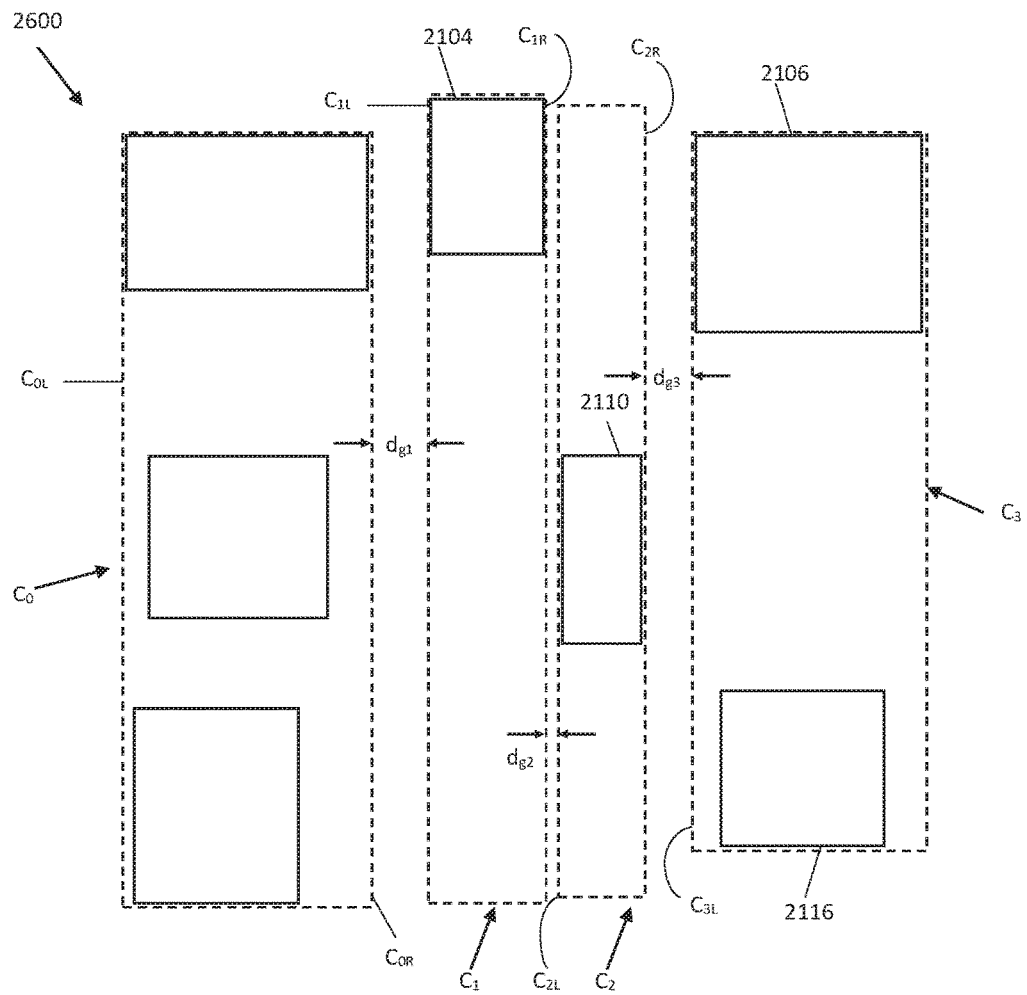

It can be seen from the afore-described example that by projecting content elements of earlier rows onto later rows to determine likely columns, the presence of empty cells do not influence the detection of columns, and indeed the empty cells are correctly allocated within the columns, e.g., the empty cell between the ink objects 2106 and 2116 is allocated within the third column $C_2$. This is also the case however, in input situations where there is only a single content element within a column such as in the example matrix of FIG. 12. For example, FIG. 26 shows an alternative example arrangement 2600, which is the same as the arrangement 2100 but the ink object 2114 is not present. Accordingly, through the recognition process of the present system and method as described above, it may be determined that four columns $C_0$, $C_1$, $C_2$ and $C_3$ are present, as shown by dashed bounding boxes surrounding the ink objects allocated into those columns. This is because, unlike in the earlier example of the arrangement 2100, the ink object 2114 does not overlap with both of the ink objects 2104 and 2110, and as such these remain allocated to the second and third columns, as determined at the stage of FIG. 23 in the earlier example. Accordingly, in this alternative example each of the objects 2104 and 2110 are allocated as the only objects within their respective columns and the empty cells about these objects are also allocated into those columns.

The afore-described example 'coarse' column detection processes may cause the detection of excess vertical alignments, due to misaligned elements (from non-uniformity of handwriting), non-aligned elements (such as sign designators, e.g., plus and minus), and complex elements (such as sub-matrices, equations), as variously depicted in the examples of FIGS. 4 to 20. As such, as described earlier the present system and method may also process the coarse detection result with a fine detection process in which it is determined whether some of the detected possible columns should be merged. Examples of such further processing are now described with respect to FIGS. 27 to 31.

Figure 27:
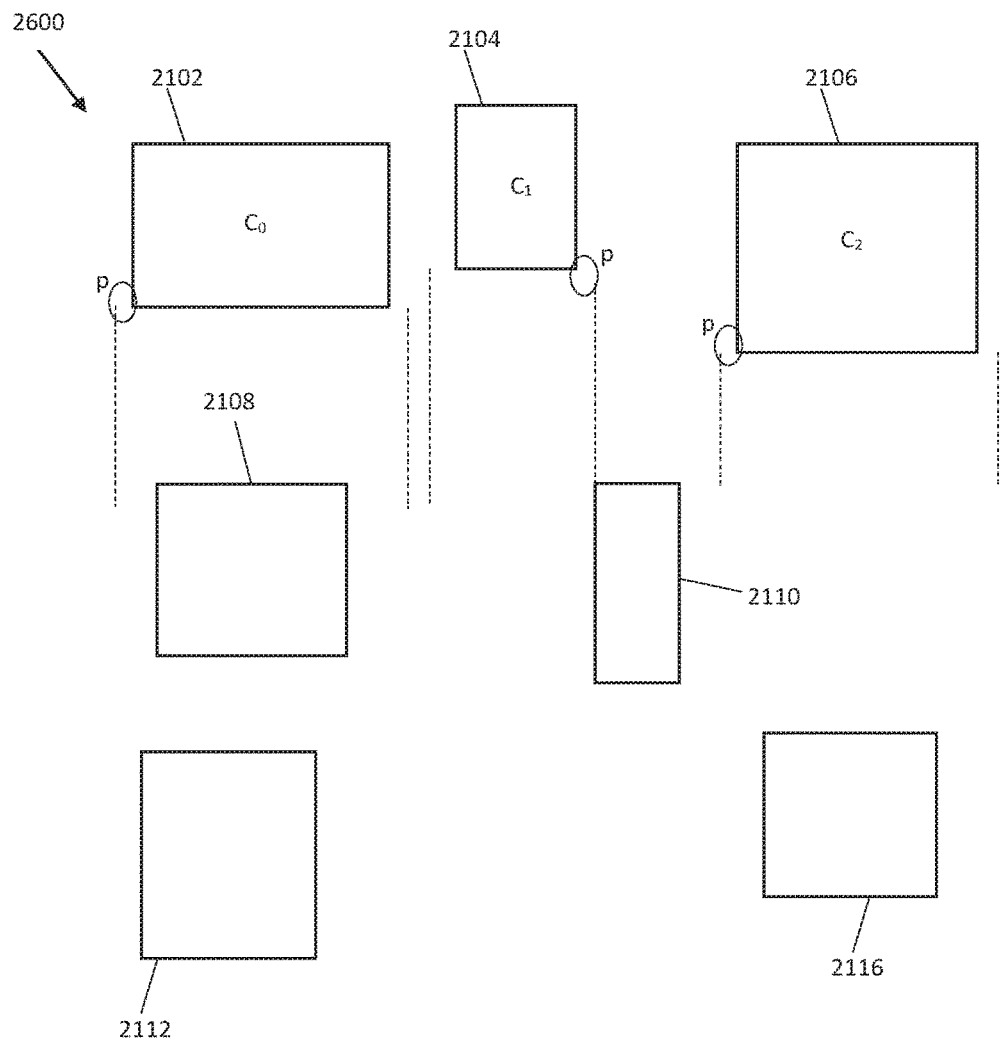
Figure 28:
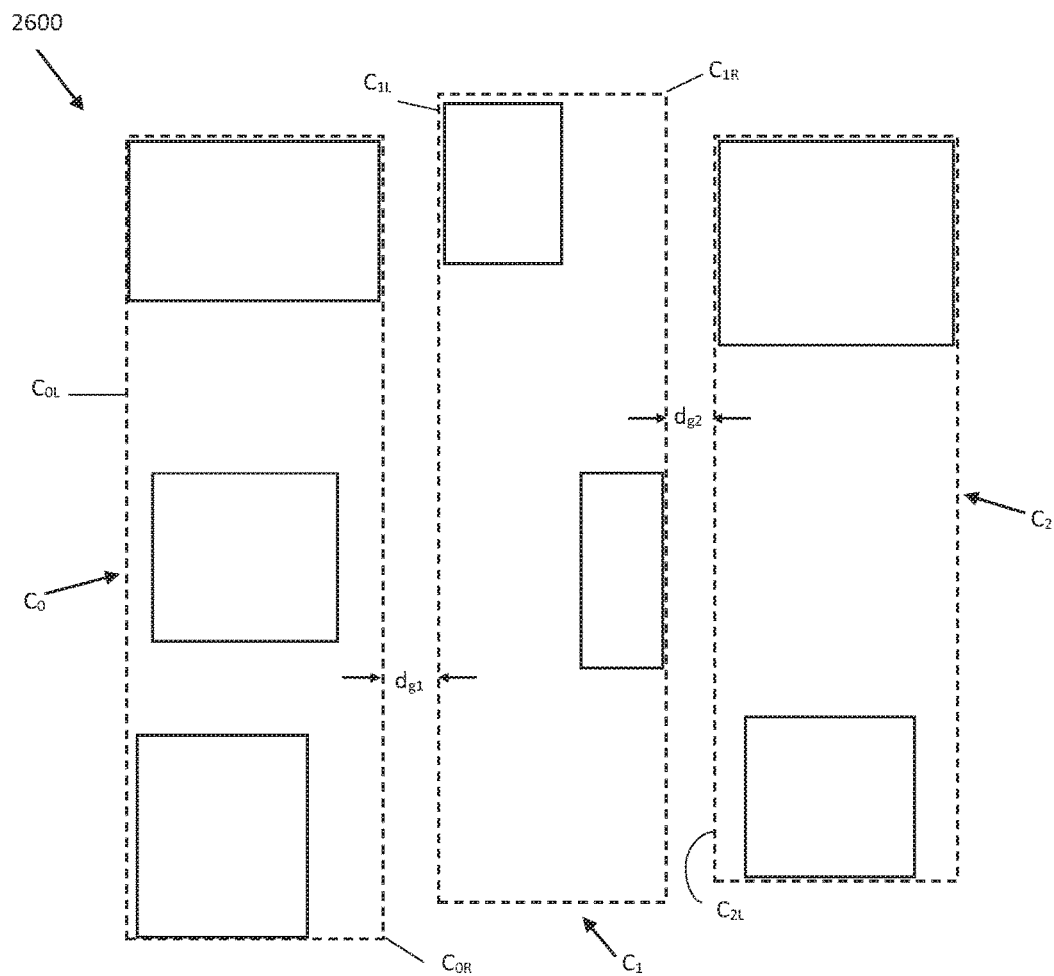

As described earlier, the first threshold may be set to a positive value. Such a setting basically causes a certain amount of padding to be provided about each ink object, thereby increasing the spacing required between columns for detection. Such padding can be used within the initial 'coarse' filtering or in subsequent 'fine' filtering to provide a mechanism to merge columns which are closely spaced. For example, FIG. 27 shows the process at the stage of the earlier example of FIG. 22, but with a certain amount of padding p (designated by the circles in FIG. 27) applied to the ink objects 2102, 2104 and 2106 for the alternative arrangement 2600 of FIG. 26. In this example, the value of the first threshold is set so that the padding p causes the ink object 2110 to vertically overlap with the ink object 2104. Accordingly, the column detection process of the present system and method results in the column allocation as shown in FIG. 28, in which the objects 2104 and 2110 are again allocated to the same column in a three column layout, like in the example of the arrangement 2100. The value of the first threshold can be arbitrarily set (and resettable by users through the UI for example), or can be automatically defined by the system and method, for example, in relation to characteristics of the handwriting, like average or mean dimensions of the handwritten objects, such as characters.

Figure 29:
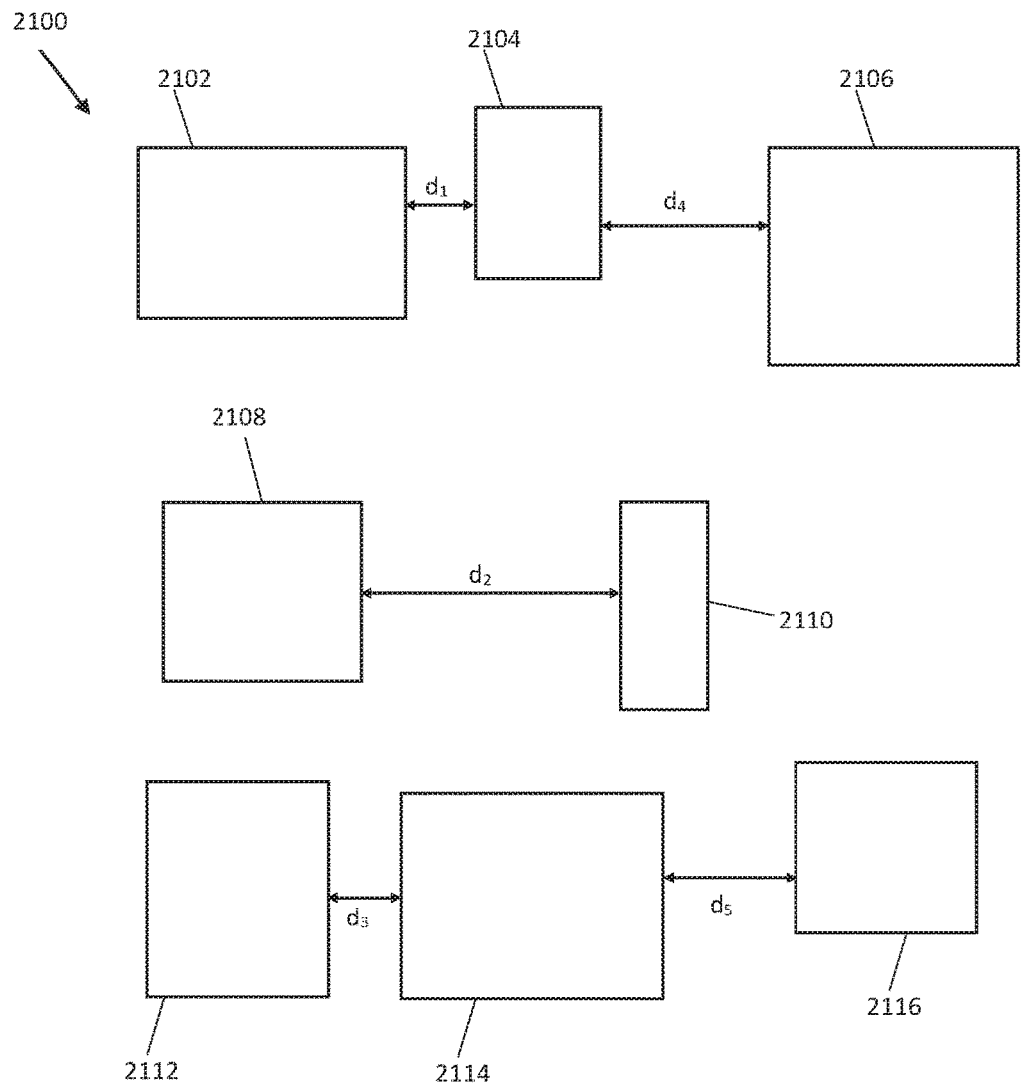

An alternative or additional mechanism for fine filtering the column allocations is to take into account the relative spacing of elements across the recognized two-dimensional structure. This can be done in several ways. FIG. 29 shows the arrangement 2100 with the horizontal distances between each of the ink objects 2102 to 2116 illustrated. That is, the distance $d_1$ between the objects 2102 and 2104, the distance $d_2$ between the objects 2108 and 2110, the distance $d_3$ between the objects 2112 and 2114, the distance $d_4$ between the objects 2104 and 2106 and the distance $d_5$ between the objects 2114 and 2116. From these distances the mean, average, minimum and maximum distances between the content elements of each column can be determined. For example, the mean distance $d_{m1}$ between the columns $C_0$ and $C_1$ is the mean of the distances $d_1$, $d_2$ and $d_3$, and the mean distance $d_{m2}$ between the columns $C_1$ and $C_2$ is the mean of the distances $d_4$ and $d_5$. Such normalized distances of the coarsely allocated columns can be compared to other parameters of the input arrangement to provide a check of the allocations, which are provided as another (second) threshold for column detection.

An example of such a parameter as the second threshold is the spacing between the detected potential columns. This spacing is shown for example in FIGS. 25, 26 and 28 variously as the distance $d_{g1}$, $d_{g2}$ and $d_{g3}$ which are measured between the right and left hand boundaries of the column bounding boxes, indicated in subscript as "$_{nL}$" and "$_{nR}$" for each of the columns $C_0$ to $C_3$, where "n" is the number of the column, e.g., 0 to 3. For example, the second threshold set on this parameter for merging columns may be the maximum positive spacing, such as $d_{g2}$ in FIG. 25, scaled down by a pre-determined constant value, such as about 0.1 to about 0.7, and typically about 0.3, for example, to provide for natural variations in handwriting, which is used to compare with the mean distance of each column, e.g., the mean distances $d_{m1}$ and $d_{m2}$. Based on this comparison, if the mean distance is less than this second threshold value then the columns are merged. In this way, detected columns that are reasonably much less spaced than the largest spaced column, which is considered to have a high likelihood of being a column, are merged as they likely do not constitute columns.

Figure 30:
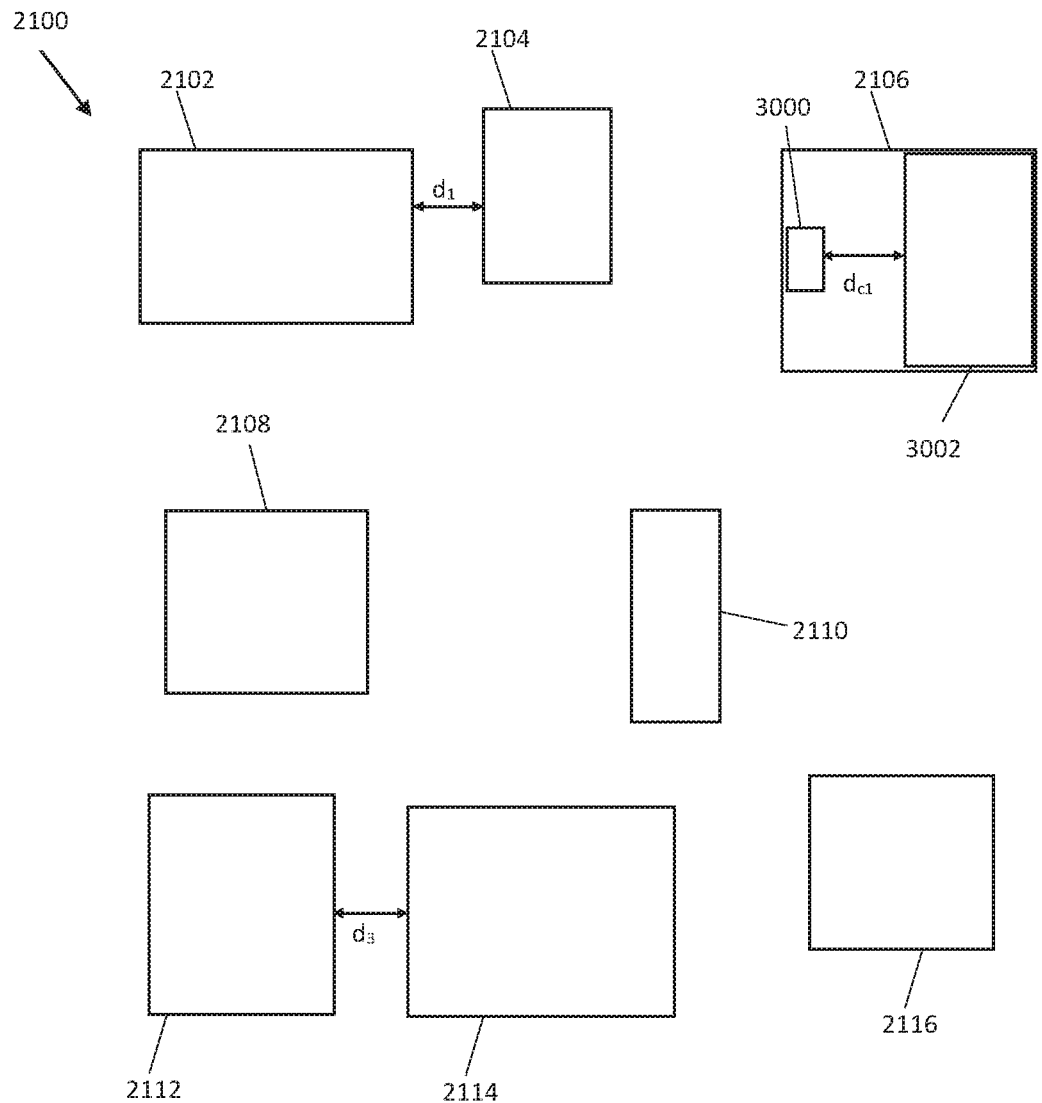
Figure 31:
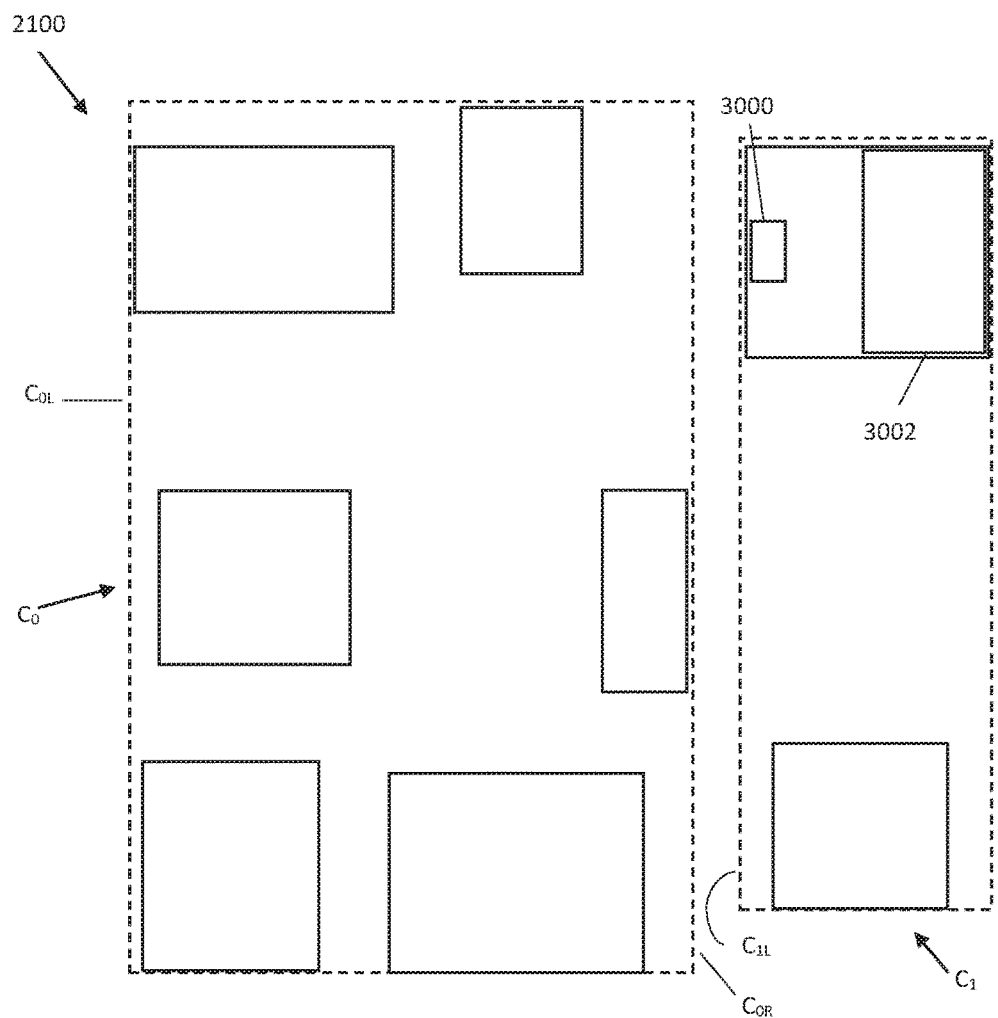

Another example of such a parameter as the second threshold is the spacing within certain content elements. Such as the spacing between content features like alphabetic characters, words, numbers, superscripts, subscripts, brackets, symbols, and designators, such as minus and plus signs and divider lines. For example, FIG. 30 shows the ink object 2106 constituted by two elements 3000 and 3002 separated by a distance $d_{c1}$. For example, the element 3000 may be a designator, such as a minus sign, and the element 3002 may be a number. The present system and method may treat such adjacent elements as recognized by the HWR system 114 as single content elements based on rules set in the application 112 or the HWR system 114 itself may return ink objects in this way, for example, as described earlier with respect to FIGS. 8, 9 and 10. For example, the second threshold set on this parameter for merging columns may be the maximum spacing between such elements scaled up by a pre-determined constant value, such as about 1.1 to about 1.7, and typically about 1.4, for example, to provide for natural variations in handwriting, and compare this value with the mean distance of each column. Based on this comparison, if the mean distance is less than this second threshold value then the columns are merged, as shown in FIG. 31 in which the first and second columns of FIG. 25 are merged because the distance $d_{g1}$ is less than the scaled distance $d_{c1}$, for example, so that two re-allocated columns $C_0$ and $C_1$ remain. In this way, detected columns that are reasonably spaced less than the largest spaced connected elements, like numbers with minus and plus signs, are merged as they likely do not constitute columns since it is expected that columns are spaced more widely than the inter-element spacing.

The use of the mean, or other common value, spacing of the ink objects in each coarsely detected column in the above-described merge operations based on global and maximal features of the recognized structure provide a relatively robust evaluation of any possible over-segmentation of the structure due to local variations within the structure.

As described earlier, the above-described examples of column detection can also apply to row detection, in which the vertical alignments are known from the HWR system 114 and used by the application 112 to determine the rows. Further, in the above-described examples of coarse and fine two-dimensional structure detection, the detection result can be provided as one or more probability scores for each detected column and row, which are calculated for example in terms of geometric cost for that probability result. That is, the described first and second thresholds are parameters against which the geometrical relationships of the recognized content of the handwritten input is compared to determine the geometrical cost of that recognized content being in a particular structure, such as rows and columns. This cost can be supplemented to the actual recognition results from the HWR system 114 and/or the structure detection result of the application 112 as weightings, for example, to the probability produced through the handwriting recognition results. In this way, the influence of certain recognized content on the subsequent allocation to structural elements can be easily made, such as allowing closer spacing for numerals as described earlier, merging of columns and/or rows, increasing the probability of a matrix based on the similarity of content, e.g., all numbers, characters, equations, increasing the probability score for a matrix if brackets or fence elements are detected in proximity to content elements.

The various examples described herein can be applied to forms of input for recognition other than handwriting, such as offline recognition in which images rather than digital ink are recognized, for example, the elements may be input as an image captured as a photograph of writing on paper or a whiteboard, digitally captured on an interactive smart-board, etc.

The described methods and systems increase processing and recognition speed of multiple objects in two-dimensional structures, such as a matrix of numbers, characters, mathematical functions or equations, and combinations thereof, as structure recognition is performed in consideration of the recognition of the objects themselves. Furthermore, writing of structures, such as matrices, does not require specific user action for recognition, such as creating a new writing area, tapping a matrix button, drawing brackets, etc. Further, no learning or training of the algorithm is required, however this could be performed to improve results.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

I claim:

1. A system for recognizing an arrangement of multiple objects on computing devices, each computing device comprising a processor, a memory and at least one non-transitory computer readable medium for recognizing handwriting input under control of the processor, the at least one non-transitory computer readable medium configured to:
   determine, with the medium, at least one geometrical relationship between a plurality of recognized elements of the handwriting input; and
   allocate, with the medium, the recognized elements having the at least one geometrical relationship therebetween to corresponding positions of an arrangement of the recognized elements at least partially determined by boundaries of the recognized elements.

2. A system as claimed in claim 1, wherein the positions of the arrangement are cells of a two-dimensional structure of the recognized elements.

3. A system as claimed in claim 1, wherein the at least one geometrical relationship is an overlap of the plurality of recognized elements in one or more directions of the arrangement.

4. A system as claimed in claim 3, the at least one non-transitory computer readable medium configured to determine the overlap based on a comparison of a directional distance between one or more geometrical features of the plurality of recognized elements with at least one geometrical threshold.

5. A system as claimed in claim 4, wherein the at least one geometrical threshold is based on at least one geometrical spacing of at least some of the recognized elements.

6. A system as claimed in claim 5, wherein the at least one geometrical spacing is a maximum spacing between components of the at least some of the recognized elements.

7. A method for recognizing an arrangement of multiple objects on computing devices, each computing device comprising a processor and at least one non-transitory computer readable medium for recognizing handwriting input under control of the processor, the method comprising:
   determining, with the medium, at least one geometrical relationship between a plurality of recognized elements of the handwriting input; and
   allocating, with the medium, the recognized elements having the at least one geometrical relationship therebetween to corresponding positions of an arrangement of the recognized elements at least partially determined by boundaries of the recognized elements.

8. A method as claimed in claim 7, wherein the positions of the arrangement are cells of a two-dimensional structure of the recognized elements.

9. A method as claimed in claim 7, wherein the at least one geometrical relationship is an overlap of the plurality of recognized elements in one or more directions of the arrangement.

10. A method as claimed in claim 9, comprising determining the overlap based on a comparison of a directional distance between one or more geometrical features of the plurality of recognized elements with at least one geometrical threshold.

11. A method as claimed in claim 10, wherein the at least one geometrical threshold is based on at least one geometrical spacing of at least some of the recognized elements.

12. A method as claimed in claim 11, wherein the at least one geometrical spacing is a maximum spacing between components of the at least some of the recognized elements.

13. A non-transitory computer readable medium having a computer readable program code embodied therein, said computer readable program code adapted to be executed to implement a method for recognizing an arrangement of multiple objects input to a computing device, the computing device comprising a processor and at least one system non-transitory computer readable medium for recognizing handwriting input under control of the processor, the method comprising:
   determining, with the medium, at least one geometrical relationship between a plurality of recognized elements of the handwriting input; and
   allocating, with the medium, the recognized elements having the at least one geometrical relationship therebetween to corresponding positions of an arrangement of the recognized elements at least partially determined by boundaries of the recognized elements.

14. A non-transitory computer readable medium as claimed in claim 13, wherein the positions of the arrangement are cells of a two-dimensional structure of the recognized elements.

15. A non-transitory computer readable medium as claimed in claim 13, wherein the at least one geometrical relationship is an overlap of the plurality of recognized elements in one or more directions of the arrangement.

16. A non-transitory computer readable medium as claimed in claim 15, comprising determining the overlap based on a comparison of a directional distance between one or more geometrical features of the plurality of recognized elements with at least one geometrical threshold.

17. A non-transitory computer readable medium as claimed in claim 16, wherein the at least one geometrical threshold is based on at least one geometrical spacing of at least some of the recognized elements.

18. A non-transitory computer readable medium as claimed in claim 17, wherein the at least one geometrical spacing is a maximum spacing between components of the at least some of the recognized elements.

* * * * *